US011152881B2

United States Patent
Tsuchimoto et al.

(10) Patent No.: US 11,152,881 B2
(45) Date of Patent: Oct. 19, 2021

(54) PERMANENT MAGNET SYNCHRONOUS ELECTRIC MOTOR CONTROL DEVICE, ELECTRIC POWER STEERING DEVICE, AND ELECTRIC VEHICLE

(71) Applicant: Mitsubishi Electric Corporation, Tokyo (JP)

(72) Inventors: Yuya Tsuchimoto, Tokyo (JP); Isao Kezobo, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/964,667

(22) PCT Filed: Mar. 13, 2018

(86) PCT No.: PCT/JP2018/010900
§ 371 (c)(1),
(2) Date: Jul. 24, 2020

(87) PCT Pub. No.: WO2019/180795
PCT Pub. Date: Sep. 26, 2019

(65) Prior Publication Data
US 2021/0058018 A1 Feb. 25, 2021

(51) Int. Cl.
*H02P 21/22* (2016.01)
*B62D 5/04* (2006.01)
(Continued)

(52) U.S. Cl.
CPC .............. *H02P 21/22* (2016.02); *B62D 5/046* (2013.01); *H02P 25/022* (2013.01); *H02P 25/22* (2013.01)

(58) Field of Classification Search
CPC ........ H02P 21/22; H02P 25/022; H02P 25/22; B62D 5/046
See application file for complete search history.

(56) References Cited

U.S. PATENT DOCUMENTS

| 2014/0054103 A1* | 2/2014 | Kezobo ............... G01R 31/343 180/446 |
| 2017/0237377 A1* | 8/2017 | Furukawa ............... H02P 29/00 318/564 |
| 2019/0291775 A1* | 9/2019 | Taki ..................... B62D 5/0493 |

FOREIGN PATENT DOCUMENTS

| JP | 6022951 B2 | 11/2016 |
| JP | 2017-017909 A | 1/2017 |
| JP | 6164166 B2 | 7/2017 |

OTHER PUBLICATIONS

International Search Report for PCT/JP2018/010900, dated May 29, 2018.

* cited by examiner

*Primary Examiner* — Zoheb S Imtiaz
(74) *Attorney, Agent, or Firm* — Sughrue Mion, PLLC; Richard C. Turner

(57) ABSTRACT

A control device includes: a first power converter applying a voltage to a first winding; a second power converter applying a voltage to a second winding; a first power supply circuit supplying power to the first power converter; a second power supply circuit supplying power to the second power converter; a current command calculator; a first current controller; and a second current controller. The second power supply circuit supplies power at a voltage higher than a voltage of the first power supply circuit. The current command calculator calculates a first voltage usage state, which is an indicator value correlated with a magnitude of the output voltage of the first power converter with respect to a power supply voltage output at a time of supply of power by the first power supply circuit, and calculates the second current command based on the first voltage usage state.

9 Claims, 15 Drawing Sheets

(51) Int. Cl.
*H02P 25/022* (2016.01)
*H02P 25/22* (2006.01)

PERMANENT MAGNET SYNCHRONOUS ELECTRIC MOTOR CONTROL DEVICE, ELECTRIC POWER STEERING DEVICE, AND ELECTRIC VEHICLE

CROSS REFERENCE TO RELATED APPLICATIONS

This application is a National Stage of International Application No. PCT/JP2018/010900 filed Mar. 19, 2018.

TECHNICAL FIELD

The present invention relates to: a control device for a permanent magnet synchronous motor, which is configured to drive the permanent magnet synchronous motor by different output voltages based on power supply from two systems of power supply circuits; an electric power steering device; and an electric vehicle.

BACKGROUND ART

Hitherto, there has been known occurrence of a state (hereinafter referred to as "voltage saturation") in which an induced voltage becomes larger as a rotation speed of a permanent magnet synchronous motor becomes higher, and thus the permanent magnet synchronous motor cannot apply a desired voltage due to a restriction on a power supply voltage. As a result, a desired current cannot be caused to flow, and thus an output torque becomes lower.

To address this issue, there is known a motor control device including an inverter configured to convert an input DC current from a DC voltage power supply to an AC current based on a rotator phase of a motor, and output the AC current (e.g., refer to Patent Literature 1). In Patent Literature 1, the following field-weakening current is calculated, and caused to flow. The field-weakening current is a current that is the maximum within a range in which a current input to the inverter does not exceed a predetermined upper limit value while a torque current is maintained. With this, in Patent Literature 1, flux-weakening control is performed to reduce the voltage, and an output torque in a high-speed region is improved.

Further, there is also known related art that ensures redundancy for a failure to allow the operation to be continued by switching a device configuration and a device control method at the time of occurrence of a failure (e.g., refer to Patent Literature 2). When such related art is applied, usage of different two types of devices increases reliability for a failure more than when the two devices of the same type are used. In a control device for a multi-winding rotating machine described in Patent Literature 2, 12 V and 48 V power supply circuits (batteries) are combined to obtain power.

CITATION LIST

Patent Literature

[PTL 1] JP 2017-17909 A
[PTL 2] JP 6164166 B2

SUMMARY OF INVENTION

Technical Problem

The following description treats a general permanent magnet synchronous motor having double windings. Further, regarding a control device, there is assumed a widely known current command calculation method, which is used at the time of driving a permanent magnet synchronous motor by different output voltages based on power supplied from two systems of power supply circuits. In this case, a related-art control method cannot actively use a surplus voltage for a high-voltage power supply, which has an enough output voltage compared to a low-voltage power supply, to sufficiently improve an output torque in a high-speed rotation region.

For example, the control device for a multi-winding rotating machine described in Patent Literature 2 has a configuration in which the 12 V power supply circuit and the 48 V power supply circuit are connected to two individual power converters. However, this control device does not generate a current command that effectively uses a high voltage.

As a method of generating a current command, there is a widely known method of driving two systems of power converters based on the same current command for the two systems. However, this widely known method has a problem in that voltage saturation occurs in a system having a low power supply voltage, and a desired current cannot be caused to flow, resulting in decrease in output torque.

Further, the motor control device in Patent Literature 1 can set individual flux-weakening currents for the two systems of the power converters. The purpose of performing such individual setting is to suppress heat. However, it is not possible to effectively use a high voltage to sufficiently improve an output torque in a high-speed region simply by setting a flux-weakening current on a low-voltage side and a flux-weakening current on a high-voltage side individually as in Patent Literature 1.

The reason is that, with only the above-mentioned individual setting, the flux-weakening current on the low-voltage side is determined based on a power supply voltage on the low-voltage side, and the flux-weakening current on the high-voltage side is determined based on a power supply voltage on the high-voltage side. With this, even when the output torque caused on the high-voltage side at the time of rotation at high speed can be maintained, a torque caused on the low-voltage side decreases. As a result, the output torque in the high-speed region cannot be sufficiently improved.

The present invention has been made to solve the above-mentioned problem, and has an object to provide a control device for a permanent magnet synchronous motor, an electric power steering device, and an electric vehicle, which are capable of sufficiently improving an output torque in a high-speed region.

Solution to Problem

In order to solve the above-mentioned problem, according to one embodiment of the present invention, there is provided a control device for a permanent magnet synchronous motor including a first winding and a second winding, the control device including: a first power converter configured to apply a voltage to the first winding; a second power converter configured to apply a voltage to the second winding; a first power supply circuit configured to supply power to the first power converter; a second power supply circuit configured to supply power to the second power converter at a voltage higher than a voltage of the first power supply circuit; a current command calculation unit configured to calculate a first current command being a target value of a current caused to flow through the first winding, and a second current command being a target value of a current caused to flow through the second winding; a first current control unit configured to control an output voltage of the first power converter in accordance with the first current command; and a second current control unit configured to control an output voltage of the second power converter in accordance with the second current command, wherein the current command calculation unit is configured to calculate a first voltage usage state, which is an indicator value correlated with a magnitude of the output voltage of the first power converter with respect to a power supply voltage output at a time of supply of power by the first power supply circuit, and calculate the second current command based on the first voltage usage state.

Advantageous Effects of Invention

According to the present invention, with the configuration described above, it is possible to sufficiently improve the output torque in the high-speed region.

BRIEF DESCRIPTION OF DRAWINGS

FIG. 8 are timing charts of waveforms, which are shown by comparing various kinds of characteristics with respect to a rotation speed at a time when a permanent magnet synchronous motor is driven by a widely known control device based on the same current command for two systems, in which

FIG. 9 are timing charts of waveforms, which are shown by comparing various kinds of characteristics with respect to the rotation speed at a time when the permanent magnet synchronous motor is driven by the control device illustrated in FIG. 1, in which

FIG. 14 are timing charts of waveforms, which are shown by comparing various kinds of characteristics with respect to the rotation speed at a time when the permanent magnet synchronous motor is driven by a control device in one example of the widely known technology, in which

FIG. 15 are timing charts of waveforms, which are shown by comparing various kinds of characteristics with respect to the rotation speed at a time when the permanent magnet synchronous motor is driven by a control device in another example of the widely known technology.

FIG. 16 are timing charts of waveforms, which are shown by comparing various kinds of characteristics with respect to the rotation speed at a time when the permanent magnet synchronous motor is driven by a control device according to the second embodiment of the present invention, in which

DESCRIPTION OF EMBODIMENTS

Now, description is given in detail of a control device for a permanent magnet synchronous motor, an electric power steering device, and an electric vehicle according to some embodiments of the present invention with reference to the drawings.

First Embodiment

Figure 1:
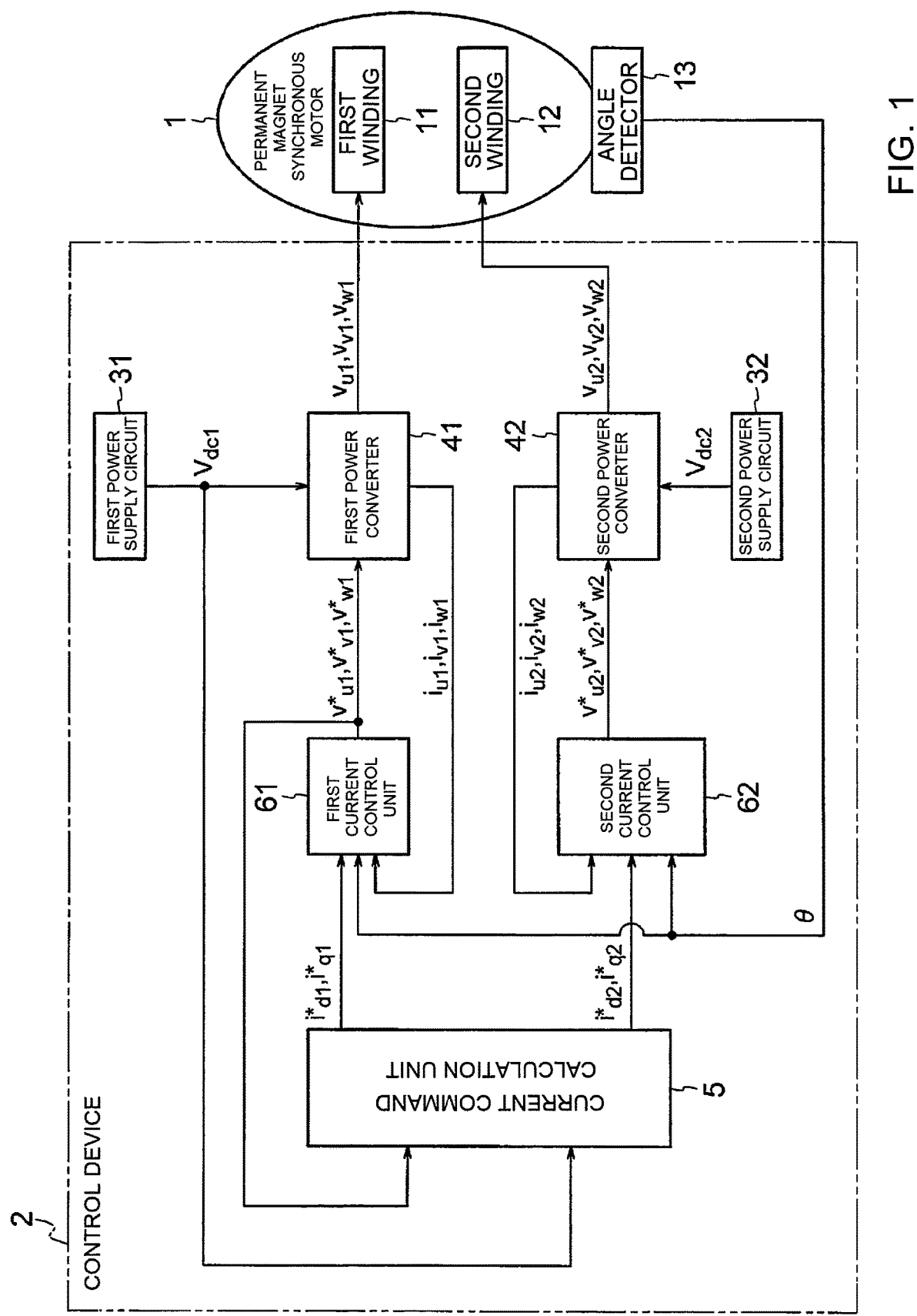
FIG. 1 is a circuit block diagram for illustrating a basic configuration of a control device for a permanent magnet synchronous motor according to a first embodiment of the present invention.

FIG. 1 is a circuit block diagram for illustrating a basic configuration of a control device 2 for a permanent magnet synchronous motor 1 according to a first embodiment of the present invention.

Referring to FIG. 1, the permanent magnet synchronous motor 1 includes, as two sets of three-phase windings, a first winding 11 and a second winding 12 being double windings. Further, the permanent magnet synchronous motor 1 has a configuration in which a rotator is arranged inside of a stator so that a field flux is caused by a permanent magnet or a field winding. An angle detector 13 configured to detect a rotation angle θ of the rotator is mounted to the permanent magnet synchronous motor 1.

A generally known surface permanent magnet (SPM) synchronous motor or imbedded permanent magnet (IPM) synchronous motor can be used for the permanent magnet synchronous motor 1. A widely known angle detector such as a resolver or Hall sensor can be used for the angle detector 13.

Now, description is given of an exemplary case in which the permanent magnet synchronous motor 1 in the first embodiment incudes two sets of three-phase windings. However, the permanent magnet synchronous motor 1 in the first embodiment may include windings of four or more phases. Further, a value estimated by, for example, a voltage equation may be used as the rotation angle θ without using a value detected by the angle detector 13.

The control device 2 includes a first power supply circuit 31, a second power supply circuit 32, a first power converter 41, a second power converter 42, a first current control unit 61, a second current control unit 62, and a current command calculation unit 5. Among those components, the first power supply circuit 31, the first power converter 41, and the first current control unit 61 relating to the first winding 11 are referred to as "first system", and the second power supply circuit 32, the second power converter 42, and the second current control unit 62 relating to the second winding 12 are referred to as "second system".

The first power supply circuit 31 is configured to output a first DC power supply voltage $V_{dc1}$ in order to supply power to the first power converter 41. The second power supply circuit 32 is configured to output a second DC power supply voltage $V_{dc2}$, which is a voltage higher than the first DC power supply voltage $V_{dc1}$, in order to supply power to the second power converter 42. That is, the first system is a low-voltage side, and the second system is a high-voltage side. Batteries for outputting the first DC power supply voltage $V_{dc1}$ and the second DC power supply voltage $V_{dc2}$ may be used for the first power supply circuit 31 and the second power supply circuit 32, respectively, or a circuit configured to convert an AC voltage to the first DC power supply voltage $V_{dc1}$ or the second DC power supply voltage $V_{dc2}$ may be used for the first power supply circuit or the second power supply circuit 32. Further, a configuration in which a filter circuit having a purpose of reducing noise or the like is connected to a battery for outputting the first DC power supply voltage $V_{dc1}$ or the second DC power supply voltage $V_{dc2}$ may be employed.

The first power converter 41 is configured to convert the first DC power supply voltage $V_{dc1}$ output from the first power supply circuit 31 to first three-phase voltages $v_{u1}$, $v_{v1}$, and $v_{w1}$ to be applied to the first winding 11. The second power converter 42 is configured to convert the second DC power supply voltage $V_{dc2}$ output from the second power supply circuit 32 to second three-phase voltages $v_{u2}$, $v_{v2}$, and $v_{w2}$ to be applied to the second winding 12. The first power converter 41 and the second power converter 42 can be constructed by using a widely known power converter such as an inverter or a matrix converter.

The first power converter 41 is configured to subject input first three-phase voltage commands $v_{u1}^*$, $v_{v1}^*$, and $v_{w1}^*$ to widely known modulation processing, to thereby apply an AC voltage to each of a u-phase winding u1, a v-phase winding v1, and a w-phase winding w1 of the first winding 11. Similarly, the second power converter 42 is configured to subject input second three-phase voltage commands $v_{u2}^*$, $v_{v2}^*$, and $v_{w2}^*$ to widely known modulation processing, to thereby apply an AC voltage to each of a u-phase winding u2, a v-phase winding v2, and a w-phase winding w2 of the second winding 12.

Widely known modulation processing to be executed by each of the first power converter 41 and the second power converter 42 is, for example, a pulse width modulation (PWM) method or a pulse amplitude modulation (PAM) method.

A first current detector is mounted to the first power converter 41. This first current detector is configured to detect a current $i_{u1}$ of the first u-phase winding u1, a current $i_{v1}$ of the first v-phase winding v1, and a current $i_{w1}$ of the first w-phase winding w1, and transmit those currents to the first current control unit 61. Those currents $i_{u1}$, $i_{v1}$, and $i_{w1}$ can be collectively regraded as a first three-phase winding current.

Similarly, a second current detector is mounted to the second power converter 42. This second current detector is configured to detect a current $i_{u2}$ of the second u-phase winding u2, a current $i_{v2}$ of the second v-phase winding v2, and a current $i_{w2}$ of the second w-phase winding w2, and transmit those currents to the second current control unit 62. Those currents $i_{u2}$, $i_{v2}$, and $i_{w2}$ can be collectively regraded as a second three-phase winding current.

Each of the first current detector and the second current detector is constructed by using a widely known current detector using a shunt resistor, a Hall element, or the like. In the above description, the first three-phase winding currents $i_{u1}$, $i_{v1}$, and $i_{w1}$ and the second three-phase winding currents $i_{u2}$, $i_{v2}$, and $i_{w2}$ are detected as detection values by the first current detector and the second current detector, respectively. However, a value estimated by, for example, a voltage equation may be used without using those detection values.

The current command calculation unit 5 is configured to read the first DC power supply voltage $V_{dc1}$, which is output from the first power supply circuit 31, and the first three-phase voltage commands $v_{u1}^*$, $v_{v1}^*$, and $v_{w1}^*$, which are output from the first current control unit 61. Then, the current command calculation unit 5 is configured to calculate, based on the first DC power supply voltage $V_{dc1}$ and the first three-phase voltage commands $v_{u1}^*$, $v_{v1}^*$, and $v_{w1}^*$, a first current command being a target value of a current caused to flow through the first winding 11, and a second current command being a target value of a current caused to flow through the second winding 12.

The current command calculation unit 5 is configured to calculate, as the first current command, a first d-axis current command $i_{d1}^*$ and a first q-axis current command $i_{q1}^*$ on dp axes being rotation coordinate axes. Further, the current command calculation unit 5 is configured to calculate, as the second current command, a second d-axis current command $i_{d2}^*$ and a second q-axis current command $i_{q2}^*$ on the dp axes being the rotation coordinate axes. In this case, the current command calculation unit 5 calculates, based on the first DC power supply voltage $V_{dc1}$ and the first three-phase voltage commands $v_{u1}^*$, $v_{v1}^*$, and $v_{w1}^*$ described above, a first voltage usage state $x_1$ being an indicator value correlated with the magnitude of the output voltage of the first power converter 41. Then, the current command calculation unit 5 calculates the second current command so as to avoid saturation of the output voltage based on the first voltage usage state $x_1$. This is a technical feature of the current command calculation unit 5. A detailed method of calculating the first voltage usage state $x_1$, the first current command, and the second current command is described later in detail.

The first current control unit 61 is configured to receive input of the first three-phase windings $i_{u1}$, $i_{v1}$, and $i_{w1}$ from the first power converter 41, the rotation angle θ from the angle detector 13, and the first d-axis current command $i_{d1}^*$ and the first q-axis current command $i_{q1}^*$ being first current commands from the current command calculation unit 5. Further, the first current control unit 61 is configured to generate the first three-phase voltage commands $v_{u1}^*$, $v_{v1}^*$, and $v_{w1}^*$ in accordance with those inputs, and output those commands to the first power converter 41.

The second current control unit 62 is configured to receive input of the second three-phase windings $i_{u2}$, $i_{v2}$, and $i_{w2}$ from the second power converter 42, the rotation angle θ from the angle detector 13, and the second d-axis current command $i_{d2}^*$ and the second q-axis current command $i_{q2}^*$ being second current commands from the current command calculation unit 5. Further, the second current control unit 62 is configured to generate the second three-phase voltage commands $v_{u2}^*$, $v_{v2}^*$, and $v_{w2}^*$ in accordance with those inputs, and output those commands to the second power converter 42.

Figure 2:
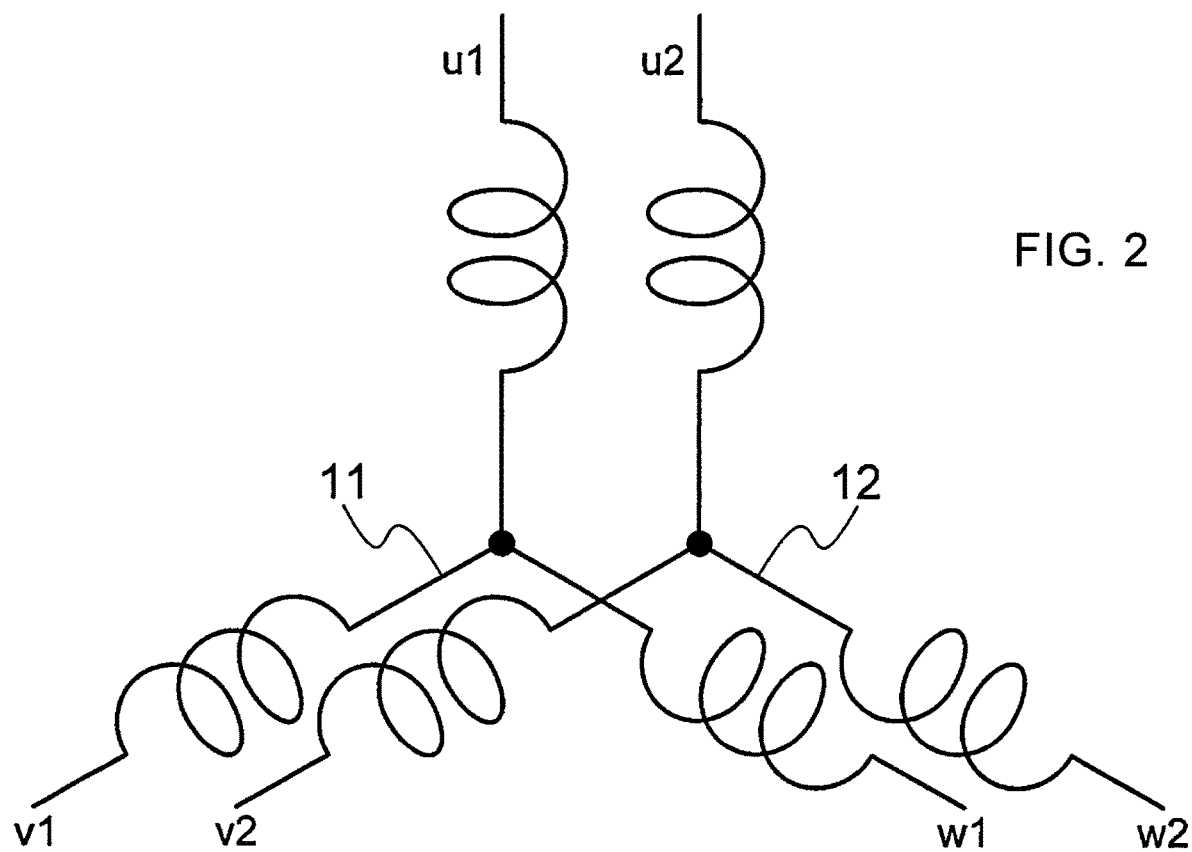
FIG. 2 is a perspective view of an extracted first winding and second winding of the permanent magnet synchronous motor illustrated in FIG. 1.

FIG. 2 is a perspective view of the extracted first winding 11 and second winding 12 of the permanent magnet synchronous motor 1. Referring to FIG. 2, the first winding 11 of the permanent magnet synchronous motor 1 includes the u-phase winding u1, the v-phase winding v1, and the w-phase winding w1. The second winding 12 includes a u-phase winding u2, a v-phase winding v2, and a w-phase winding w2. It is assumed that, in the permanent magnet synchronous motor 1 used in the first embodiment, there is no mutual inductance between the first winding 11 and the second winding 12.

Figure 3:
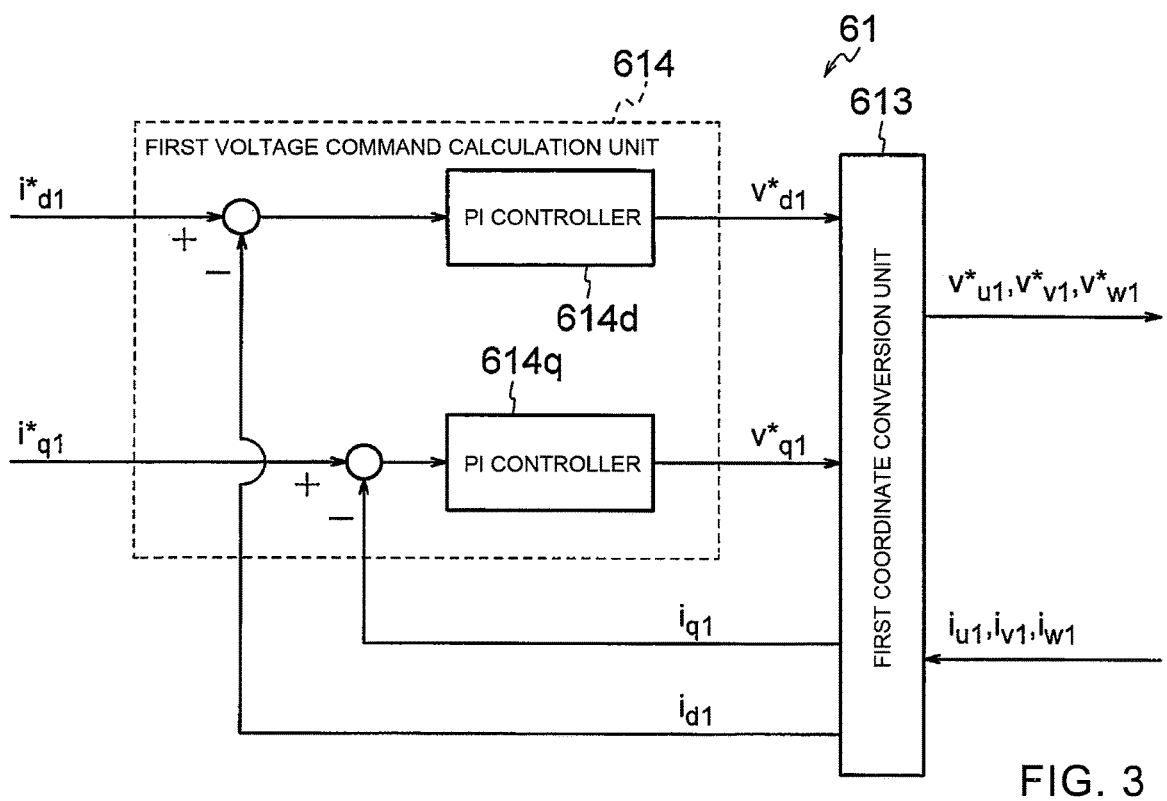
FIG. 3 is a circuit block diagram for illustrating a schematic configuration of a first current control unit included in the control device illustrated in FIG. 1.

FIG. 3 is a circuit block diagram for illustrating a schematic configuration of the first current control unit 61 included in the control device 2.

Referring to FIG. 3, the first current control unit 61 includes a first coordinate conversion unit 613 and a first voltage command calculation unit 614. The first coordinate conversion unit 613 is configured to convert coordinates of a first d-axis voltage command $v_{d1}^*$ and a first q-axis voltage command $v_{q1}^*$ based on the rotation angle θ from the angle detector 13, to thereby generate a first u-phase voltage command $v_{u1}^*$, a first v-phase voltage command $v_{v1}^*$, and a first w-phase voltage command $v_{w1}^*$. Further, the first coordinate conversion unit 613 is configured to convert coordinates of a u-phase detection current $i_{u1}$, a v-phase detection current $i_{v1}$, and a w-phase detection current $i_{w1}$ based on the rotation angle θ from the angle detector 13, to thereby generate a first d-axis detection current $i_{d1}$ and a first q-axis detection current $i_{q1}$. The first d-axis detection current $i_{d1}$ and the first q-axis detection current $i_{q1}$ can be collectively regraded as a first detection current.

The first voltage command calculation unit 614 is configured to calculate the first d-axis voltage command $v_{d1}^*$ and the first q-axis voltage command $v_{q1}^*$ so as to decrease a deviation between the first current command and the first detection current. A method of calculating the first d-axis voltage command $v_{d1}^*$ and the first q-axis voltage command $v_{q1}^*$ is not particularly limited, and a widely known method of calculating the voltage command may be used as the method. In FIG. 3, there is illustrated an exemplary configuration in which a PI controller 614d being a proportional/integral controller is used for calculating the first d-axis voltage command $v_{d1}^*$ as a feedback controller for a deviation between the first d-axis current command $i_{d1}^*$ and the first d-axis detection current $i_{d1}$. Similarly, there is illustrated an exemplary configuration in which a PI controller 614q being a proportional/integral controller is used for calculating the first q-axis voltage command $v_{q1}^*$ as a feedback controller for a deviation between the first q-axis current command $i_{q1}^*$ and the first q-axis detection current $i_{q1}$.

Figure 4:
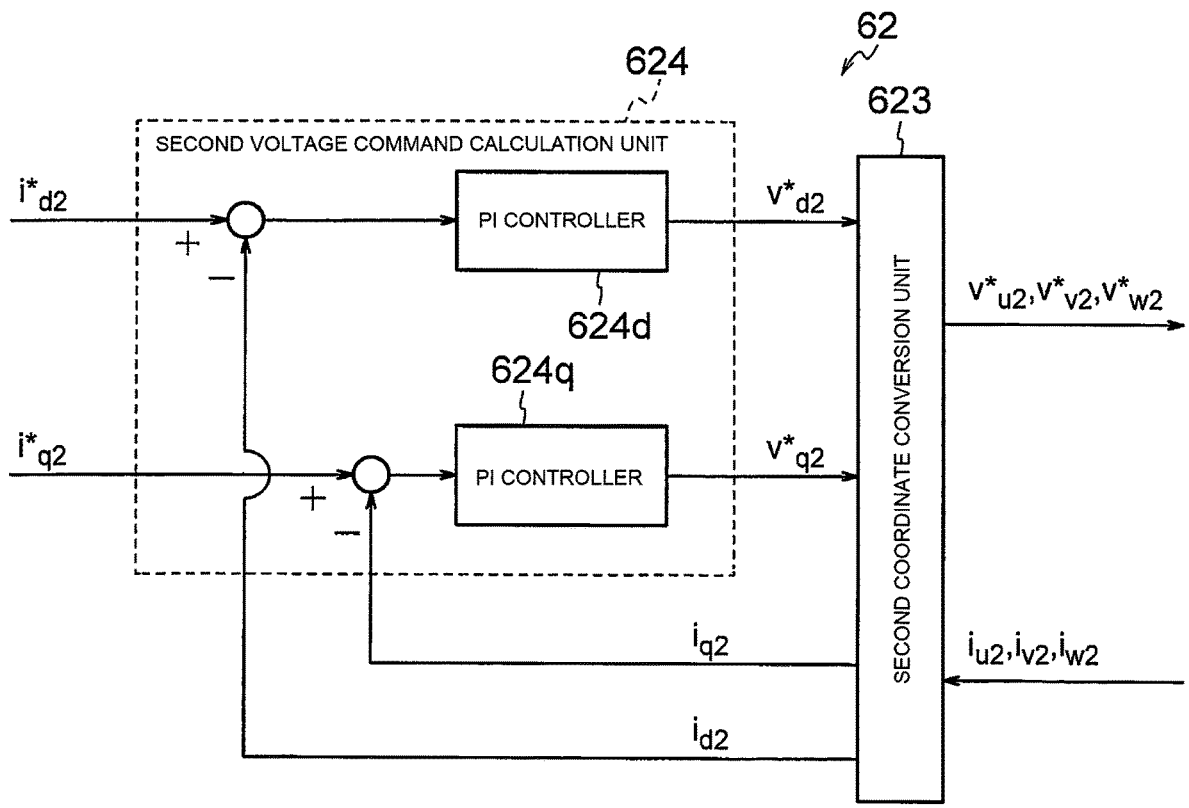
FIG. 4 is a circuit block diagram for illustrating a schematic configuration of a second current control unit included in the control device illustrated in FIG. 1.

FIG. 4 is a circuit block diagram for illustrating a schematic configuration of the second current control unit 62 included in the control device 2.

Referring to FIG. 4, the second current control unit 62 includes a second coordinate conversion unit 623 and a second voltage command calculation unit 624. The second coordinate conversion unit 623 is configured to convert coordinates of a second d-axis voltage command $v_{d2}^*$ and a second q-axis voltage command $v_{q2}^*$ based on the rotation angle θ from the angle detector 13, to thereby generate a second u-phase voltage command $v_{u2}^*$, a second v-phase voltage command $v_{v2}^*$, and a second w-phase voltage command $v_{w2}^*$. Further, the second coordinate conversion unit 623 is configured to convert coordinates of a u-phase detection current $i_{u2}$, a v-phase detection current $i_{v2}$, and a w-phase detection current $i_{w2}$ based on the rotation angle θ from the angle detector 13, to thereby generate a second d-axis detection current $i_{d2}$ and a second q-axis detection current $i_{q2}$. The second d-axis detection current $i_{d2}$ and the second q-axis detection current $i_{q2}$ can be collectively regraded as a second detection current.

The second voltage command calculation unit 624 is configured to calculate the second d-axis voltage command $v_{d2}^*$ and the second q-axis voltage command $v_{q2}^*$ so as to decrease a deviation between the second current command and the second detection current. A method of calculating the second d-axis voltage command $v_{d2}^*$ and the second q-axis voltage command $v_{q2}^*$ is not particularly limited, and a widely known method of calculating the voltage command may be used as the method. In FIG. 4, there is illustrated an exemplary configuration in which a PI controller 624d being a proportional/integral controller is used for calculating the second d-axis voltage command $v_{d2}^*$ as a feedback controller for a deviation between the second d-axis current command $i_{d2}^*$ and the second d-axis detection current $i_{d2}$. Similarly, there is illustrated an exemplary configuration in which a PI controller 624q being a proportional/integral controller is used for calculating the second q-axis voltage command $v_{q2}^*$ as a feedback controller for a deviation between the second q-axis current command $i_{q2}^*$ and the second q-axis detection current $i_{q2}$.

The current command calculation unit 5 is configured to calculate the first d-axis current command $i_{d1}^*$ and the first q-axis current command $i_{q1}^*$ on the d-q axes being the rotation coordinate axes as the first current command, and calculate the second d-axis current command $i_{d2}^*$ and the second q-axis current command $i_{q2}^*$ on the d-q axes being the rotation coordinate axes as the second current command.

Figure 5:
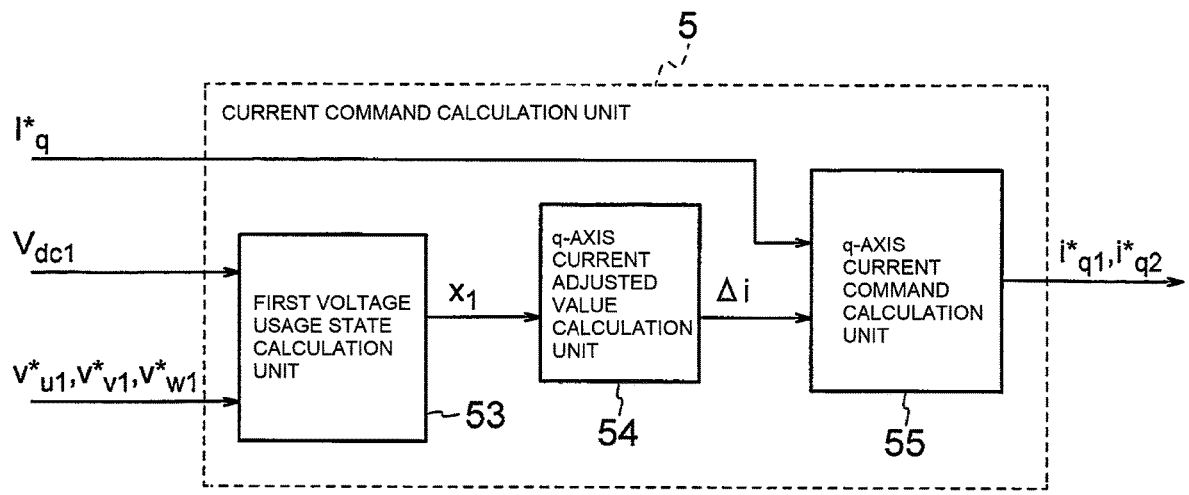
FIG. 5 is a circuit block diagram for illustrating a schematic configuration of a current command calculation unit included in the control device illustrated in FIG. 1.

FIG. 5 is a circuit block diagram for illustrating a schematic configuration of the current command calculation unit 5 included in the control device 2.

Referring to FIG. 5, the current command calculation unit 5 includes a first voltage utilization state calculation unit 53, a q-axis current adjusted value calculation unit 54, and a q-axis current command calculation unit 55. Among those components, first, description is given of the first voltage utilization state calculation unit 53.

Figure 6:
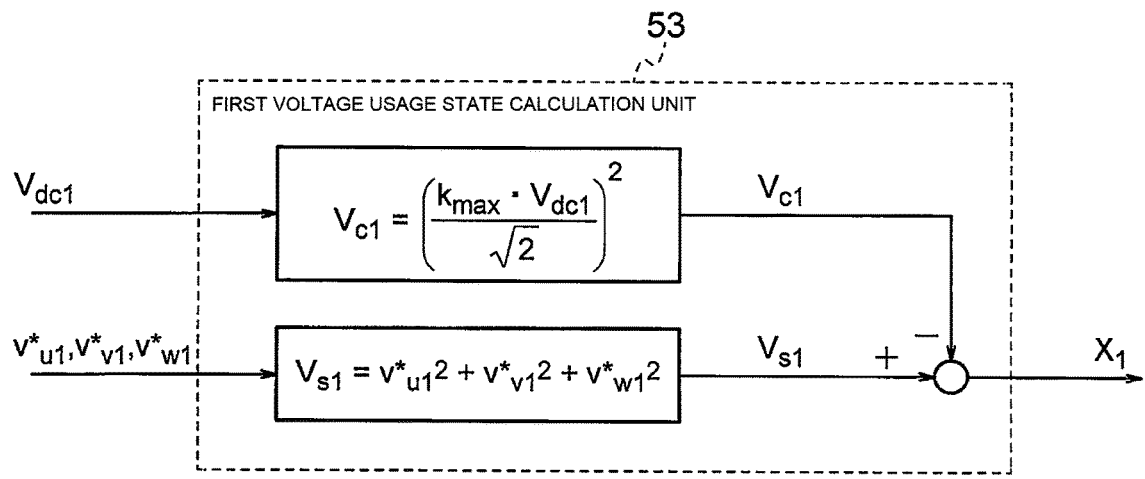
FIG. 6 is a circuit block diagram for illustrating a schematic configuration of a first voltage utilization state calculation unit included in the current command calculation unit illustrated in FIG. 5.

FIG. 6 is a circuit block diagram for illustrating a schematic configuration of the first voltage utilization state calculation unit 53 included in the current command calculation unit 5.

Referring to FIG. 6, regarding the first system on the low-voltage side, the first voltage utilization state calculation unit 53 is configured to calculate the first voltage usage state $x_1$ based on the first DC power supply voltage $V_{dc1}$ and the first three-phase voltage commands $v_{u1}^*$, $v_{v1}^*$, and $v_{w1}^*$. First, the first voltage utilization state calculation unit 53 calculates the first power supply voltage $V_{c1}$ of the first power supply circuit 31 based on the first DC power supply voltage $V_{dc1}$ in accordance with Expression (1) given below.

$$V_{c1} = \left(\frac{k_{max} \cdot V_{dc1}}{\sqrt{2}}\right)^2 \quad (1)$$

It is assumed that the first power supply voltage $V_{c1}$ is a value relating to a maximum voltage that can be output by the first DC power supply voltage $V_{dc1}$. In this case, $k_{max}$ is a maximum modulation rate, and $k_{max}$ is set to be 1.

A second power supply voltage $V_{c2}$ of the second power supply circuit 32 is calculated based on the second DC power supply voltage $V_{dc2}$ in accordance with Expression (2) given below.

$$V_{c2} = \left(\frac{k_{max} \cdot V_{dc2}}{\sqrt{2}}\right)^2 \quad (2)$$

It is assumed that the second power supply voltage $V_{c2}$ is a value relating to a maximum voltage that can be output by the second DC power supply voltage $V_{dc2}$. In this case, $k_{max}$ is a maximum modulation rate, and $k_{max}$ is set to be 1.

Next, the first voltage utilization state calculation unit 53 calculates a first output voltage $V_{s1}$, which is a value relating to the magnitude of the output voltage of the first power converter 41, and a second output voltage $V_{s2}$, which is a value relating to the magnitude of the output voltage of the second power converter 42, in accordance with Expression (3) given below.

$$\begin{cases} V_{s1} = v_{u1}^{*2} + v_{v1}^{*2} + v_{w1}^{*2} \\ V_{s2} = v_{u2}^{*2} + v_{v2}^{*2} + v_{w2}^{*2} \end{cases} \quad (3)$$

It is assumed that the first output voltage $V_{s1}$ is a sum of squares of the first three-phase voltage commands $v_{u1}^*$, $v_{v1}^*$, and $v_{w1}^*$, and the second output voltage $V_{s2}$ is a sum of squares of the second three-phase voltage commands $v_{u2}^*$, $v_{v2}^*$, and $v_{w2}^*$.

The first voltage usage state $x_1$ and the second voltage usage state $x_2$ are calculated in accordance with Expression (4) given below.

$$\begin{cases} x_1 = V_{s1} - (V_{c1} - m) \\ x_2 = V_{s2} - (V_{c2} - m) \end{cases} \quad (4)$$

In this expression, m represents a margin for the first power supply voltage $V_{c1}$. When the relationship of "first output voltage $V_{s1}$=first power supply voltage $V_{c1}$" is satisfied at the time of calculating a current command value, influence of a derivative term and voltage disturbance increases the first output voltage $V_{s1}$, resulting in a possibility of instantaneous occurrence of voltage saturation. In that case, when m is increased, a margin for the first power supply voltage $V_{c1}$ can be secured, and the voltage saturation can be avoided. In this case, m=0 is set for the sake of simplicity of description. Expression (4) given above indicates that the first voltage usage state $x_1$ can be obtained as a voltage value correlated with the magnitude of the first output voltage $V_{s1}$ based on the first DC power supply voltage $V_{dc1}$ and the first three-phase voltage commands $v_{u1}^*$, $v_{v1}^*$, and $v_{w1}^*$.

Further, in this case, when the relationship of "first output voltage $V_{s1}$≤first power supply voltage $V_{c1}$" is satisfied, the output voltage of the first power converter 41 is not restricted by the power supply voltage. However, when the relationship of "first output voltage $V_{s1}$>first power supply voltage $V_{c1}$" is satisfied, the first power converter 41 cannot generate a desired output voltage due to the restriction on the power supply voltage, and cannot cause a desired current to flow through the first power converter 41. Thus, when the first voltage usage state $x_1$ is larger than a determination value α1 set in advance, that is, when the relationship of "first output voltage $V_{s1}$-first power supply voltage $V_{c1}$>α1" is satisfied, the current command calculation unit 5 calculates such a current command as to allow the first output voltage $V_{s1}$ to be equal to or smaller than the first power supply voltage $V_{c1}$. In this case, the determination value α1=0 is set.

In this manner, the current command calculation unit 5 can calculate the first voltage usage state $x_1$ to obtain a ratio of the first output voltage $V_{s1}$ to the first power supply voltage $V_{c1}$. Further, when the first voltage usage state $x_1$ is larger than the determination value α1, the current command calculation unit 5 can also determine that such a method of calculating the current command as to avoid saturation of the output voltage is required.

Next, description is given of calculation by the q-axis current command calculation unit 55 based on the first voltage usage state $x_1$ using the current adjusted value Δi given by the q-axis current adjusted value calculation unit 54. The current adjusted value Δi calculated by the q-axis current adjusted value calculation unit 54 is described later.

The first q-axis current command $i_{q1}^*$ and the second q-axis current command $i_{q2}^*$, which are calculated by the q-axis current command calculation unit 55, are determined based on the basic q-axis current command $I_q^*$. The basic q-axis current command $I_q^*$ is a value set in order for the permanent magnet synchronous motor 1 to generate a desired output torque T, and for example, $I_q^*=T/Kt$ is given as a value proportional to the output torque T. In this case, Kt is a torque constant. The first q-axis current command $i_{q1}^*$ and the second q-axis current command $i_{q2}^*$ are set so that the sum thereof is the basic q-axis current command $I_q^*$, that is, so that $I_q^*=i_{q1}^*+i_{q2}^*$ is satisfied.

Figure 7:
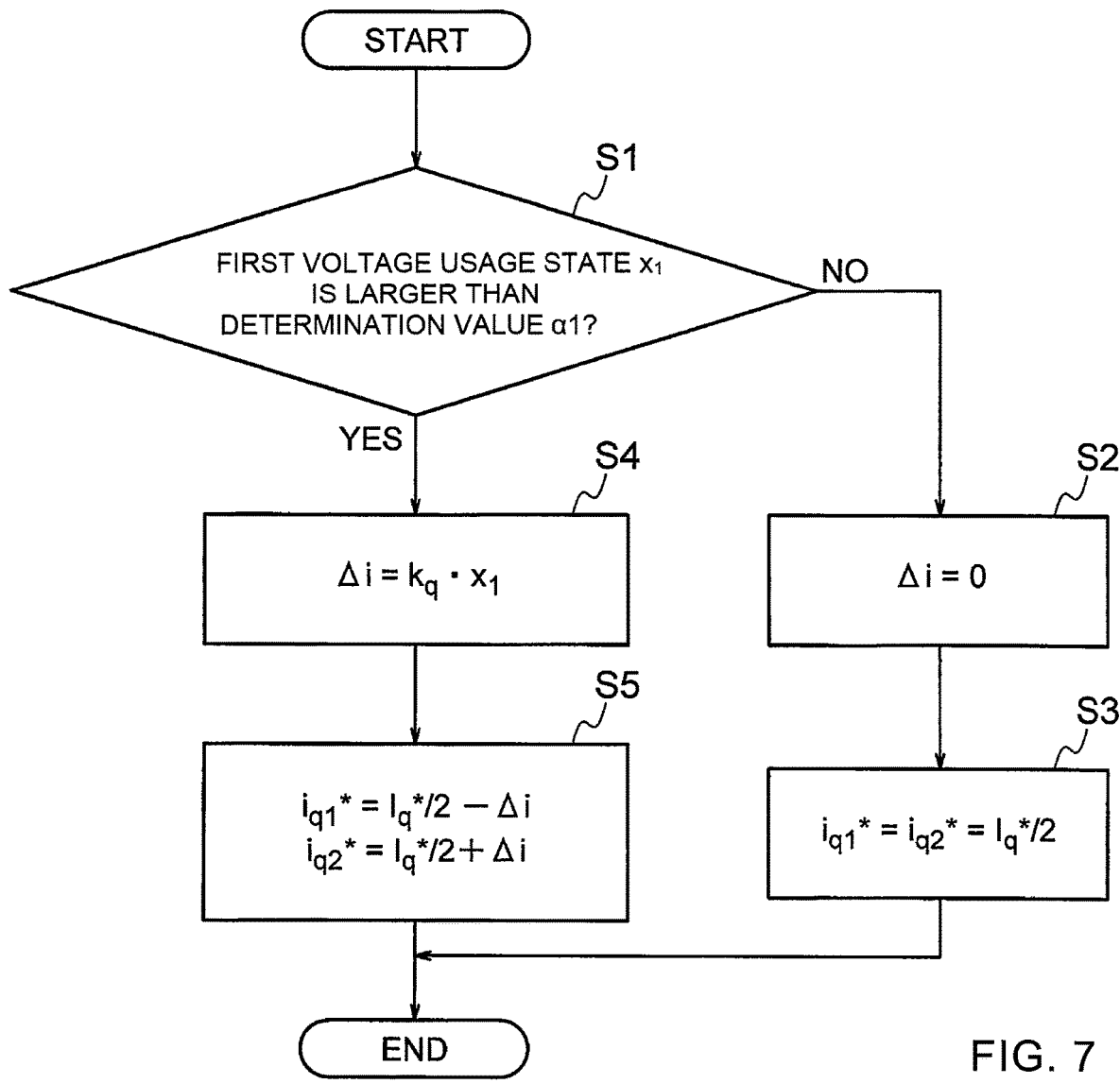
FIG. 7 is a flow chart for illustrating processing of calculating a first current command and a second current command in the current command calculation unit illustrated in FIG. 5.
Figure 8A:
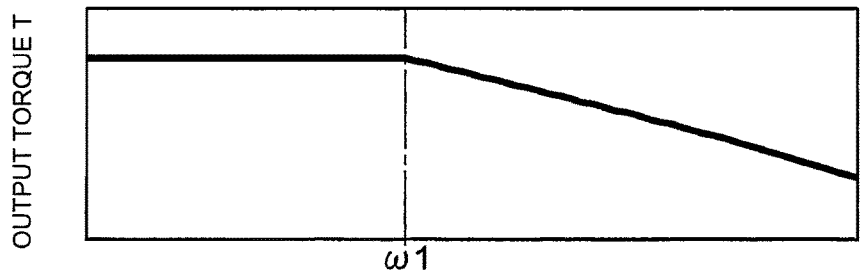
FIG. 8A is a characteristic diagram of an output torque.
Figure 8B:
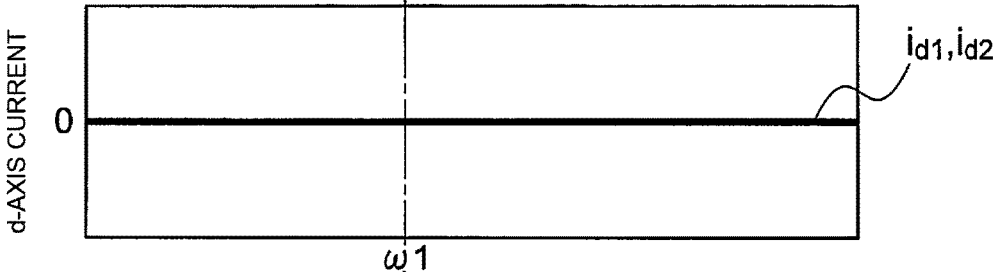
FIG. 8B is a characteristic diagram of a d-axis current.
Figure 8C:
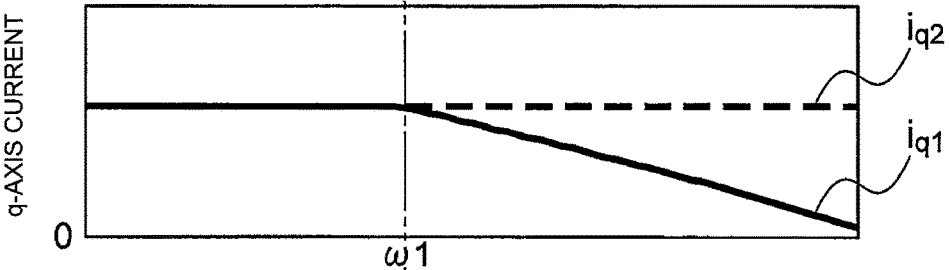
FIG. 8C is a characteristic diagram of a q-axis current.
Figure 8D:
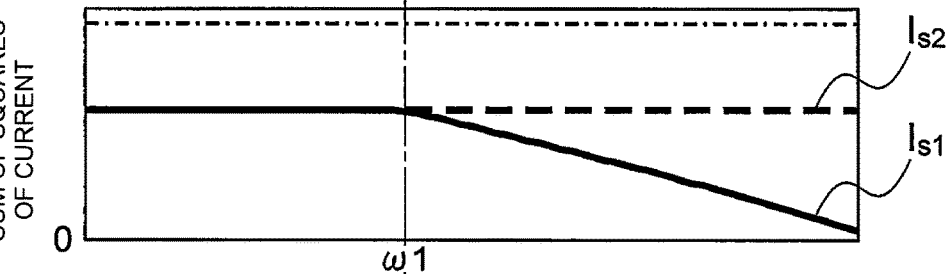
FIG. 8D is a characteristic diagram of a sum of squares of a current.
Figure 8E:
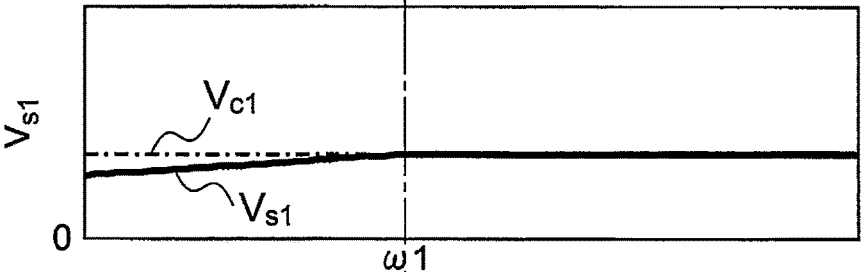
FIG. 8E is a characteristic diagram of a first output voltage.
Figure 8F:
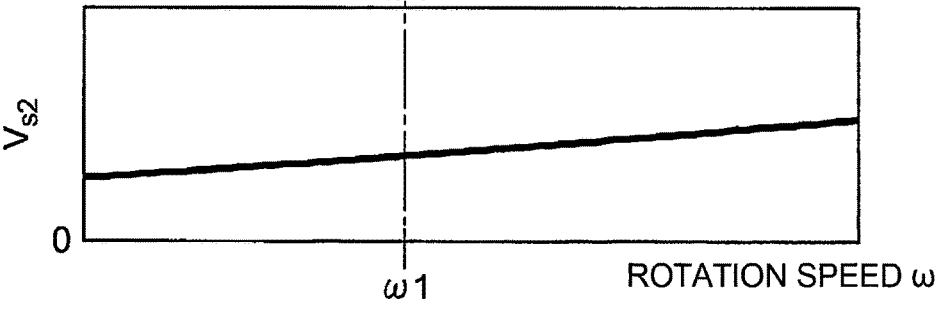
FIG. 8F is a characteristic diagram of a second output voltage.

FIG. 7 is a flow chart for illustrating processing of calculating the first current command and the second current command in the current command calculation unit 5.

Referring to FIG. 7, first, in Step S1, the current command calculation unit 5 determines whether the first voltage usage state $x_1$ is larger than the determination value $\alpha 1$. As a result of this determination, when the first voltage usage state $x_1$ is not larger than the determination value $\alpha 1$, this means that the rotation speed of the permanent magnet synchronous motor 1 is low. In this case, the current command calculation unit 5 proceeds to Step S2, and sets the current adjusted value $\Delta i=0$. After that, the current command calculation unit 5 proceeds to Step S3, and sets the first q-axis current command $i_{q1}^*$ and the second q-axis current command $i_{q2}^*$ to be equal to each other as in Expression (5) given below.

$$i_{q1}^* = i_{q2}^* = \frac{I_q^*}{2} \quad (5)$$

In this expression, $(I_q^*/2)$ indicates an average value between the first q-axis current command $i_{q1}^*$ and the second q-axis current command $i_{q2}^*$. Further, the first d-axis current command $i_{d1}^*$ and the second d-axis current command $i_{d2}^*$ are given so as to satisfy $i_{d1}^*=i_{d2}^*=0$. In other words, after the current adjusted value $\Delta i$ is set to 0, the current command calculation unit 5 executes processing of setting $i_{q1}^*=i_{q2}^*=(I_q^*/2)$, and ends the calculation processing.

In contrast, as a result of determination in Step S1, when the first voltage usage state $x_1$ is larger than the determination value $\alpha 1$, this means that the rotation speed of the permanent magnet synchronous motor 1 is high. In this case, influence of the induced voltage increases the output voltage, and the output voltage is likely to be saturated due to the restriction on the power supply voltage. The output voltage in the first system having a low power supply voltage is more likely to be saturated than that in the second system having a high power supply voltage, and when the output voltage is saturated, the current cannot be caused to flow as indicated by the command value, resulting in decrease in output torque T. Thus, in the first embodiment, a countermeasure for such a problem is executed in Step S4 and Step S5, and dq-axis voltage equations in the first system and the second system are represented by Expressions (6) and (7) given below.

$$\begin{cases} v_{d1} = (R + p \cdot L_d) \cdot i_{d1} - \omega \cdot L_q \cdot i_{q1} \\ v_{q1} = (R + p \cdot L_q) \cdot i_{q1} + \omega \cdot L_d \cdot i_{d1} + \omega \cdot \phi \end{cases} \quad (6)$$

$$\begin{cases} v_{d2} = (R + p \cdot L_d) \cdot i_{d2} - \omega \cdot L_q \cdot i_{q2} \\ v_{q2} = (R + p \cdot L_q) \cdot i_{q2} + \omega \cdot L_d \cdot i_{d2} + \omega \cdot \phi \end{cases} \quad (7)$$

In Expressions (6) and (7) given above, $v_{d1}$ represents the first d-axis voltage of the first system, $v_{d2}$ represents the second d-axis voltage of the second system, $v_{q1}$ represents the first q-axis voltage of the first system, and $v_{q2}$ represents the second q-axis voltage of the second system. Further, $i_{d1}$ represents the first d-axis current of the first system, $i_{d2}$ represents the second d-axis current of the second system, $i_{q1}$ represents the first q-axis current of the first system, and $i_{q2}$ represents the second q-axis current of the second system. Further, R represents a winding resistance, $L_d$ represents a d-axis inductance, $L_q$ represents a q-axis inductance, $\varphi$ represents the number of flux interlinkages, $\omega$ represents an electrical angular velocity, and p represents a differential operator. In the following description, $\omega$ is simply referred to as "rotation speed".

In addition, the dq-axis voltage equation of the first system in a steady state is represented by Expression (8) given below with a derivative operator of p=0.

$$\begin{cases} v_{d1} = R \cdot i_{d1} - \omega \cdot L_q \cdot i_{q1} \\ v_{q1} = R \cdot i_{q1} + \omega \cdot L_d \cdot i_{d1} + \omega \cdot \phi \end{cases} \quad (8)$$

In the first embodiment, the q-axis current is used to avoid saturation of the output voltage. Thus, in the following, $i_{d1}^*=i_{d2}^*=0$ is set to simplify the description. At this time, the dq-axis voltage equation is represented by Expression (9) given below.

$$\begin{cases} v_{d1} = -\omega \cdot L_q \cdot i_{q1} \\ v_{q1} = R \cdot i_{q1} + \omega \cdot \phi \end{cases} \quad (9)$$

On the basis of Expression (9) given above, it is understood that as the rotation speed $\omega$ becomes higher, the absolute value of the first d-axis voltage $v_{d1}$ of the first winding 11 and the absolute value of the first q-axis voltage $v_{q1}$ of the first winding 11 become larger. Further, on the basis of Expression (9) given above, it is also understood that as the absolute value of the first q-axis current $i_{q1}$ becomes smaller, the absolute value of the first d-axis voltage $v_{d1}$ and the absolute value of the first q-axis voltage $v_{q1}$ become smaller. Thus, it is understood that the absolute value of the first q-axis current $i_{q1}$ is only required to be reduced in order to avoid saturation of the output voltage.

Meanwhile, the output torque T is determined by a basic q-axis current $I_q$ ($I_q=i_{q1}+i_{q2}$) being a sum of the first q-axis current $i_{q1}$ and the second q-axis current $i_{q2}$. Thus, there is a problem in that when the absolute value of the first q-axis current $i_{q1}$ is decreased, the output torque T decreases. In view of this, regarding the second system having a high power supply voltage and a margin, the current command calculation unit 5 in the first embodiment executes calculation processing of increasing the second q-axis current $i_{q2}$ for the second winding 12. As a result, it is possible to maintain the basic q-axis current $I_q$ at a desired value to generate the desired output torque T.

Now, description is given of a method for obtaining the desired output torque T while at the same time avoiding saturation of the output voltage. This method is desired to be executed when the rotation speed $\omega$ of the permanent magnet synchronous motor 1 is high, that is, when the first voltage usage state $x_1$ is larger than the determination value $\alpha 1$. The first q-axis current command $i_{q1}^*$ and the second q-axis current command $i_{q2}^*$ are represented by Expression (10) given below.

$$\begin{cases} i_{q1}^* = \dfrac{I_q^*}{2} - \Delta i \\ i_{q2}^* = \dfrac{I_q^*}{2} + \Delta i \end{cases} \quad (10)$$

The first q-axis current command $i_{q1}^*$ and the second q-axis current command $i_{q2}^*$ are calculated based on the q-axis current adjusted value $\Delta i$ generated by the q-axis current adjusted value calculation unit 54.

Specifically, the q-axis current command calculation unit 55 executes the following calculation in order to avoid saturation of the output voltage in the first system. First, the q-axis current command calculation unit 55 calculates the first q-axis current command $i_{q1}^*$ being a target value of the first q-axis current $i_{q1}$ of the first winding 11 so that the calculated value becomes smaller than $I_q^*/2$ being an average value between the first q-axis current command $i_{q1}^*$ and the second q-axis current command $i_{q2}^*$ by the q-axis current adjusted value $\Delta i$. Further, in order to generate the desired output torque T, the basic q-axis current command $I_q^*$ being a target value of the basic q-axis current $I_q$ is required to be maintained at a desired value. Thus, the q-axis current command calculation unit 55 calculates the second q-axis current command $i_{q2}^*$ being a target value of the second q-axis current $i_{q2}$ of the second winding 12 so that the calculated value becomes larger than $I_q^*/2$ being an average value between the first q-axis current command $i_{q1}^*$ and the second q-axis current command $i_{q2}^*$ by the q-axis current adjusted value $\Delta i$.

The q-axis current adjusted value $\Delta i$ is calculated by the q-axis current adjusted value calculation unit 54 based on the first voltage usage state $x_1$ in order to avoid saturation of the output voltage in the first system on the low-voltage side. The q-axis current adjusted value calculation unit 54 calculates the q-axis current adjusted value $\Delta i$ in accordance with Expression (11) given below when the first voltage usage state $x_1$ is larger than the determination value $\alpha 1$.

$$\Delta i = k_q \cdot x_1 \quad (11)$$

In this expression, $k_q$ represents a proportional gain for calculating $\Delta i$. As shown in Expression (11) given above, the q-axis current adjusted value $\Delta i$ becomes larger as the first voltage usage state $x_1$ becomes larger. As a result, the first q-axis current command $i_{q1}^*$ is decreased by the q-axis current adjusted value $\Delta i$, and thus an effect of reducing the voltage of the first system is obtained. Further, the second q-axis voltage command $v_{q2}^*$ is increased by the q-axis current adjusted value $\Delta i$, and thus an effect of maintaining the output torque T at a fixed level is obtained.

On the basis of the above description, in the calculation processing of FIG. 7, the current command calculation unit 5 proceeds to Step S4 when determining that the first voltage usage state $x_1$ is larger than the determination value $\alpha 1$. Then, in Step S4, the current command calculation unit 5 calculates the q-axis current adjusted value $\Delta i$ in accordance with Expression (11) given above. After that, in Step S5, the current command calculation unit 5 calculates the first q-axis current command $i_{q1}^*$ and the second q-axis current command $i_{q2}^*$ in accordance with Expression (10) given above, and ends the series of calculation processing procedures.

Now, a case of driving the permanent magnet synchronous motor 1 by a widely known method and a case of driving the permanent magnet synchronous motor 1 by the method in the first embodiment are compared with each other, and an effect of the method in the first embodiment is described.

Figure 9A:
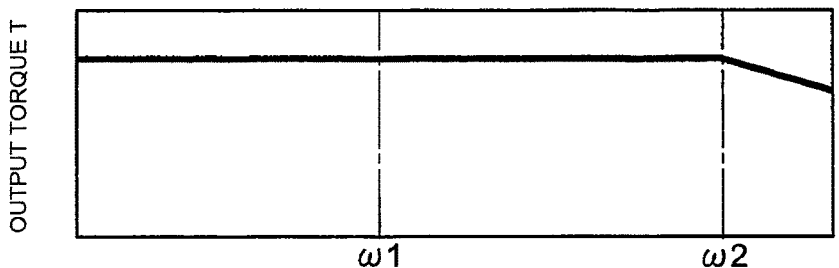
FIG. 9A is a characteristic diagram of the output torque.
Figure 9B:
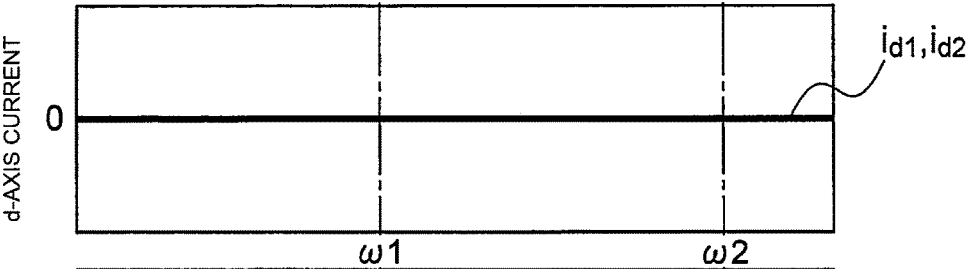
FIG. 9B is a characteristic diagram of the d-axis current.
Figure 9C:
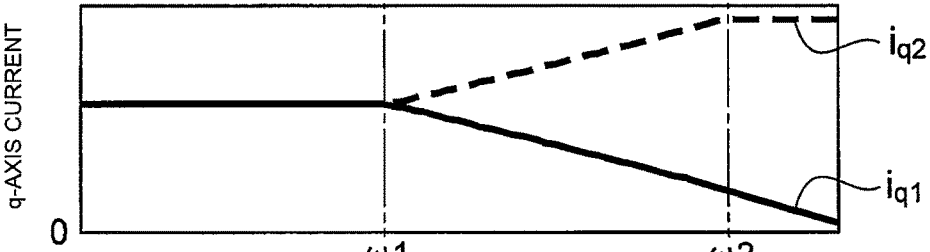
FIG. 9C is a characteristic diagram of the q-axis current.
Figure 9D:
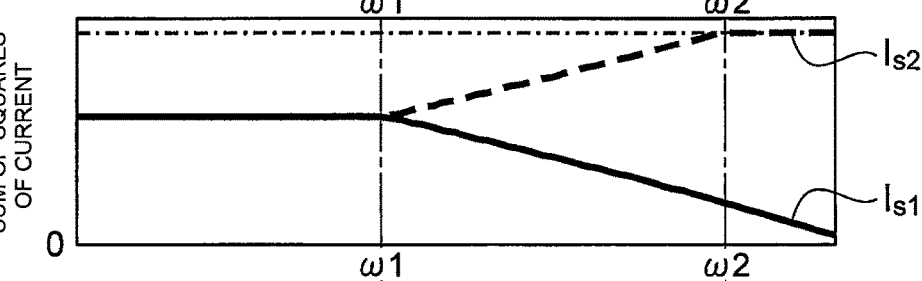
FIG. 9D is a characteristic diagram of a sum of squares of current.
Figure 9E:
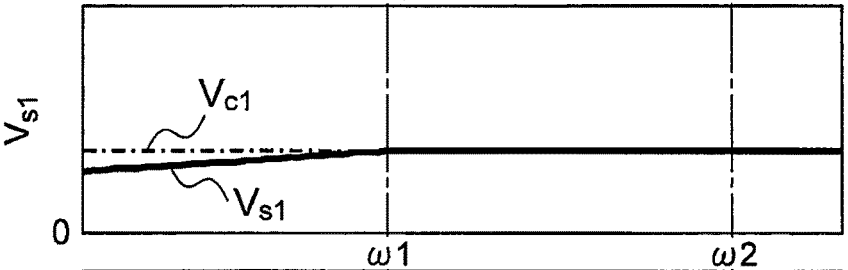
FIG. 9E is a characteristic diagram of the first output voltage.

FIG. 8 are timing charts of waveforms, which are shown by comparing various kinds of characteristics with respect to the rotation speed ω at a time when the permanent magnet synchronous motor 1 is driven by a widely known control device based on the same current command for two systems. FIG. 9 are timing charts of waveforms, which are shown by comparing various kinds of characteristics with respect to the rotation speed ω at a time when the permanent magnet synchronous motor 1 is driven by the control device 2 in the first embodiment. FIG. 8A and FIG. 9A are each a characteristic diagram of the output torque T, FIG. 8B and FIG. 9B are each a characteristic diagram of the d-axis current, and FIG. 8C and FIG. 9C are each a characteristic diagram of the q-axis current. Further, FIG. 8D and FIG. 9D are each a characteristic diagram of a sum of squares of current, FIG. 8E and FIG. 9E are each a characteristic diagram of the first output voltage $V_{s1}$, and FIG. 8F and FIG. 9F are each a characteristic diagram of the second output voltage $V_{s2}$.

Referring to FIG. 8A to FIG. 8F, a widely known control device sets the first q-axis current command $i_{q1}^*$ and the second q-axis current command $i_{q2}^*$ as $i_{q1}^* = i_{q2}^* = (I_q^*/2)$. As a result, a current that follows the target value cannot be caused to flow due to voltage saturation at the rotation speed ω equal to or larger than the rotation speed ω1, at which the first output voltage $V_{s1}$ reaches the first power supply voltage $V_{c1}$. Then, as the rotation speed ω increases from the rotation speed ω1, the first q-axis current $i_{q1}$ starts to decrease, and the output torque T decreases. At this time, the second output voltage $V_{s2}$ is sufficiently smaller than the second power supply voltage $V_{c2}$, and the output voltage has a margin for the power supply voltage.

Figure 9F:
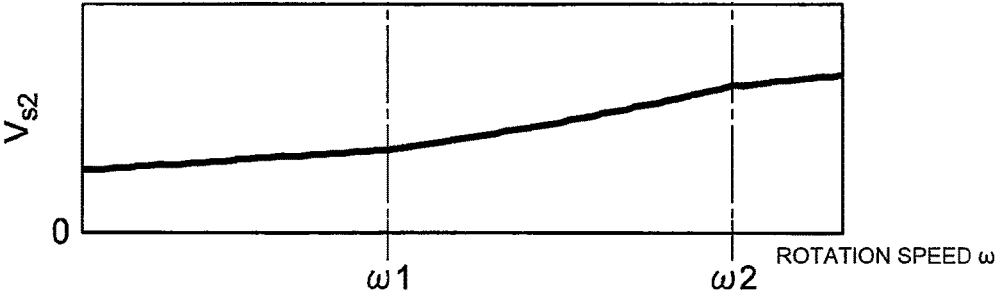
FIG. 9F is a characteristic diagram of the second output voltage.

In contrast, referring to FIG. 9A to FIG. 9F, the method in the first embodiment covers decrease in the first q-axis current $i_{q1}$ by increase in the second q-axis current $i_{q2}$. Thus, the output torque T can be maintained at a fixed level when the rotation speed ω is between the rotation speed ω1 and a rotation speed ω2 higher than the rotation speed ω1. At this time, in the second system, the second output voltage $V_{s2}$ increases more than the case of FIG. 8F due to increase in second q-axis current $i_{q2}$. However, as shown in FIG. 9F, the second output voltage $V_{s2}$ is smaller than the second power supply voltage $V_{c2}$, and thus saturation of the output voltage does not occur.

Figure 10:
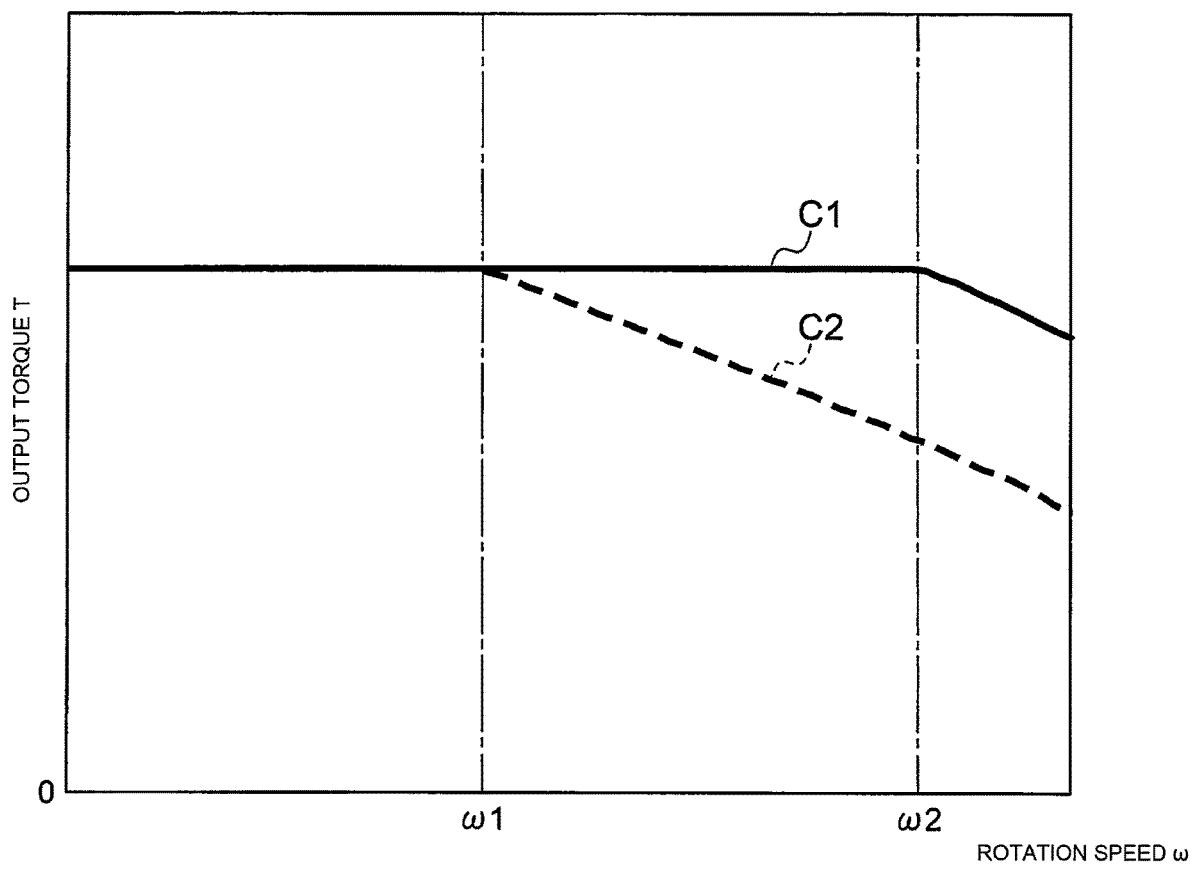
FIG. 10 is a graph, which is shown by comparing a characteristic of the output torque with a characteristic of a widely known technology with respect to the rotation speed at the time when the permanent magnet synchronous motor is driven by the control device illustrated in FIG. 1.

FIG. 10 is a graph, which is shown by comparing a characteristic C1 of the output torque T with a characteristic C2 of the widely known technology shown in FIG. 8A to FIG. 8F with respect to the rotation speed ω at the time when the permanent magnet synchronous motor 1 is driven by the control device 2.

Referring to FIG. 10, the output torque T is maintained at a fixed level for the characteristic C1 and the characteristic C2 until the rotation speed ω reaches the rotation speed ω1. However, it is understood that, in a high-speed rotation region in which the rotation speed ω exceeds the rotation speed ω1 and is smaller than the rotation speed ω2, the output torque T decreases in the case of the characteristic C2 of the widely known technology. In contrast, it is understood that the output torque T is maintained at a fixed level in such a high-speed rotation region in the case of the characteristic C1 in the first embodiment, and the output torque T is sufficiently improved compared to the widely known technology.

With the control device in the first embodiment described above, the current command of the second system on the high-voltage side is calculated based on the first voltage usage state $x_1$ of the first system on the low-voltage side. With this, it is possible to calculate such a current command as to effectively use a surplus voltage on the high-voltage side to avoid saturation of the output voltage in the first system on the low-voltage side. Therefore, it is possible to sufficiently improve the output torque T in the high-speed rotation region.

Further, when the first voltage usage state $x_1$ is larger than the determination value $\alpha 1$, the current command calculation unit in the first embodiment performs calculation so that the absolute value of the second q-axis current command $i_{q2}*$ is larger than that of the first q-axis current command $i_{q1}*$. In this manner, it is possible to sufficiently improve the output torque T by increasing the absolute value of the second q-axis current $i_{q2}$ while at the same time decreasing the absolute value of the first q-axis current $i_{q1}$ to avoid saturation of the output voltage in the first system on the low-voltage side.

Further, the current command calculation unit calculates the second q-axis current command $i_{q2}*$ based on the first voltage usage state $x_1$ so that the absolute value of the second q-axis current command $i_{q2}*$ is larger than an average value between the absolute value of the first q-axis current command $i_{q1}*$ and the absolute value of the second q-axis current command $i_{q2}*$ by the q-axis current adjusted value $\Delta i$. Further, the current command calculation unit calculates the first q-axis current command $i_{q1}*$ based on the first voltage usage state $x_1$ so that the absolute value of the first q-axis current command $i_{q1}*$ is smaller than the average value by the q-axis current adjusted value $\Delta i$. With this, it is possible to sufficiently improve the output torque T by increasing the absolute value of the second q-axis current $i_{q2}$ while at the same time decreasing the absolute value of the first q-axis current $i_{q1}$ to avoid saturation of the output voltage in the first system on the low-voltage side.

Meanwhile, in the description of the first embodiment, the first d-axis current command $i_{d1}*=0$ is set for the sake of simplicity of description. However, when the first d-axis current command $i_{d1}*<0$ is set by flux-weakening control, it is possible to increase the output torque T until an even higher rotation speed $\omega$ is reached due to the effect of flux-weakening control in addition to the effect obtained by the q-axis current adjusted value $\Delta i$.

In such a case, the first d-axis current command $i_{d1}*$ is represented by Expression (13) given below, which is obtained from Expression (12) given below specifying that a first sum of squares of current $I_{s1}$ and a second sum of squares of current $I_{s2}$ are equal to each other.

$$i_{d1}*^2 + i_{q1}*^2 = i_{d2}*^2 + i_{q2}*^2 \quad (12)$$

$$i_{d1}* = -\sqrt{i_{d2}*^2 + i_{q2}*^2 - i_{q1}*^2} = -\sqrt{i_{d2}*^2 + 2 \cdot \Delta i} = -\sqrt{i_{d2}*^2 + 2 \cdot (k_q \cdot x_1)} \quad (13)$$

The first sum of squares of current $I_{s1}$ is a sum of squares of the first d-axis current command $i_{d1}*$ and squares of the first q-axis current command $i_{q1}*$, and the second sum of squares of current $I_{s2}$ is a sum of squares of the second d-axis current command $i_{d2}*$ and squares of the second q-axis current command $i_{q2}*$.

Further, the second d-axis current command $i_{d2}*$ is represented by Expression (14) given below based on the second voltage usage state $x_2$ to perform flux-weakening control for the second system.

$$i_{d2}* = -k_{d2} \cdot x_2 \quad (14)$$

In this expression, $k_{d2}$ represents a proportional gain for calculating the second d-axis current command $i_{d2}*$.

As the first voltage usage state $x_1$ becomes larger, the absolute value of the first d-axis current command $i_{d1}*$ becomes larger, resulting in a larger effect of the flux-weakening control. Further, Expression (13) given above is obtained by modifying such a condition that the first sum of squares of current $I_{s1}$ and the second sum of squares of current $I_{s2}$ are equal to each other. Thus, the first d-axis current command $i_{d1}*$ can be determined so that the first sum of squares of current $I_{s1}$ and the second sum of squares of current $I_{s2}$ are equal to each other. When the first sum of squares of current $I_{s1}$ and the second sum of squares of current $I_{s2}$ are equal to each other, an effect of being able to suppress heat without causing one system to be heated excessively is obtained.

Figure 11:
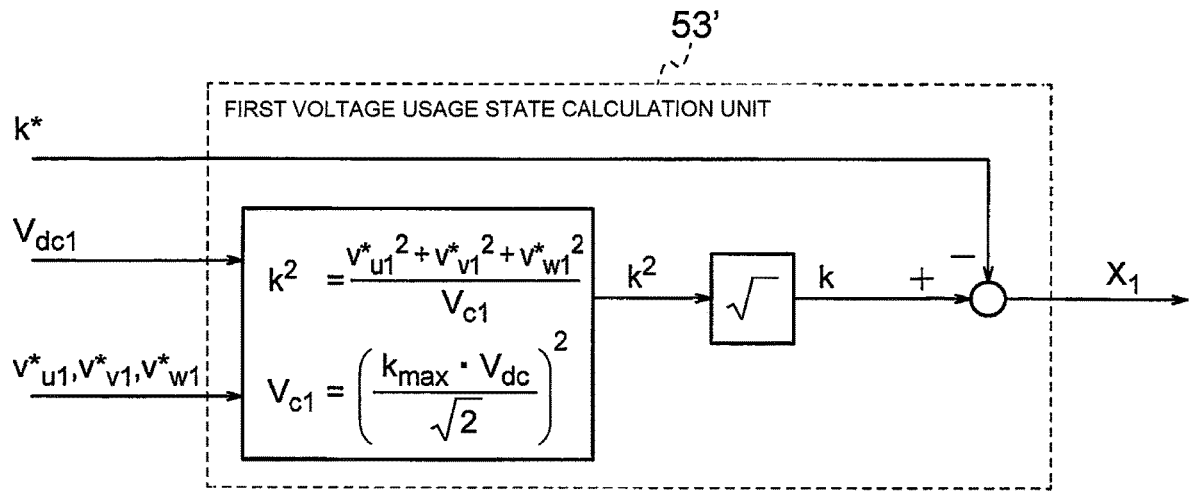
FIG. 11 is a circuit block diagram for illustrating another example of the schematic configuration of the first voltage utilization state calculation unit illustrated in FIG. 6.

The first voltage usage state $x_1$ can also be calculated by using a modulation rate. FIG. 11 is a circuit block diagram for illustrating another example of the schematic configuration of a first voltage utilization state calculation unit 53'. A modulation rate k to be used in the first voltage utilization state calculation unit 53' is calculated by Expression (15) given below based on the sum of squares of the first three-phase voltage commands $v_{u1}*$, $v_{v1}*$, and $v_{w1}*$, and the first power supply voltage $V_{c1}$ calculated from the first DC power supply voltage $V_{dc1}$.

$$\begin{cases} k = \sqrt{\dfrac{v_{u1}^{*2} + v_{v1}^{*2} * v_{w1}^{*2}}{V_{c1}}} \\ x_1 = -(k^* - k) = -k^* + k \end{cases} \quad (15)$$

A target modulation rate $k*$ in this case is only required to be set to be equal to or smaller than $k_{max}$. In this case, $k*=k_{max}$ is set in order to use the power supply voltage at the maximum. When the power supply voltage is desired to have a margin, $k*=k_{max} \times 0.9$ is only required to be set, for example. In this manner, also when the modulation rate k is used, the first voltage usage state $x_1$ can be obtained as a parameter correlated with the magnitude of the first output voltage $V_{s1}$ based on the first DC power supply voltage $V_{dc1}$ and the first three-phase voltage commands $v_{u1}*$, $v_{v1}*$, and $v_{w1}*$.

Further, the control device 2 in the first embodiment described above includes two types of power supply circuits configured to output a high voltage and a low voltage as different voltages in advance, namely, the first power supply circuit 31 and the second power supply circuit 32. Alternatively, the control device 2 may include two power supply circuits configured to output the same voltage. In the case of this configuration, when one of the power supply circuits fails to decrease the voltage, two types of power supply circuits on the high-voltage side and the low-voltage side are obtained. A basic function is maintained by applying the current command calculation unit in the first embodiment. The failure in this case indicates not a state in which the power supply circuit cannot be used completely due to disconnection, for example, but a state in which the power supply circuit can be used continuously although there is some inconvenience due to performance degradation, for example.

Further, the first power supply circuit 31 and the second power supply circuit 32 may have an opposite magnitude relationship of the power supply voltage after a failure has occurred. As an exemplary configuration, the second power supply circuit 32 has a lower voltage than that of the first power supply circuit 31 before a failure has occurred. When the voltage of the first power supply circuit 31 decreases due to occurrence of a failure, and the voltage of the second power supply circuit 32 becomes higher than that of the first power supply circuit 31, the basic function is used to compensate for inefficiency in power supply voltage that has occurred after occurrence of the failure.

In short, when the second DC power supply voltage $V_{dc2}$ output by the second power supply circuit 32 is higher than the first DC power supply voltage $V_{dc1}$ output by the first power supply circuit 31 by even a little, it is possible to obtain the effect in the first embodiment, and obtain a more significant effect as the difference becomes larger.

In the first embodiment described above, the method of calculating the second q-axis current command $i_{q2}^*$ by giving the q-axis current adjusted value $\Delta i$ as a value proportional to the first voltage usage state $x_1$ is adopted. However, the present invention is not limited to this method. The second q-axis current command $i_{q2}^*$ is only required to be a value obtained based on the first voltage usage state $x_1$. For example, such an equality or inequality restriction based on the first voltage usage state $x_1$ as to prevent saturation of the output voltage in the first system may be given, and the second q-axis current command $i_{q2}^*$ satisfying the equality or inequality restriction may be calculated by using an optimization method.

Second Embodiment

A control device 2' of a permanent magnet synchronous motor 1' in a second embodiment of the present invention is different from the control device 2 in the first embodiment in that a detailed configuration of the current command calculation unit 5' is changed due to a mutual inductance between the first winding 11 and the second winding 12 of the permanent magnet synchronous motor 1'.

The dq-axes voltage equations in the first system and the second system in the second embodiment are represented by Expressions (16) and (17) given below, respectively.

$$\begin{cases} v_{d1} = (R + p \cdot L_d) \cdot i_{d1} - \omega \cdot L_q \cdot i_{q1} - \omega \cdot M_q \cdot i_{q2} \\ v_{q1} = (R + p \cdot L_q) \cdot i_{q1} + \omega \cdot L_d \cdot i_{d1} + \omega \cdot M_d \cdot i_{d2} + \omega \cdot \phi \end{cases} \quad (16)$$

$$\begin{cases} v_{d2} = (R + p \cdot L_d) \cdot i_{d2} - \omega \cdot L_q \cdot i_{q2} - \omega \cdot M_q \cdot i_{q1} \\ v_{q2} = (R + p \cdot L_q) \cdot i_{q2} + \omega \cdot L_d \cdot i_{d2} + \omega \cdot M_d \cdot i_{d1} + \omega \cdot \phi \end{cases} \quad (17)$$

In Expressions (16) and (17) given above, $v_{d1}$ represents the first d-axis voltage of the first system, $v_{d2}$ represents the second d-axis voltage of the second system, $v_{q1}$ represents the first q-axis voltage of the first system, and $v_{q2}$ represents the second q-axis voltage of the second system. Further, $i_{d1}$ represents the first d-axis current of the first system, $i_{d2}$ represents the second d-axis current of the second system, $i_{q1}$ represents the first q-axis current of the first system, and $i_{q2}$ represents the second q-axis current of the second system. Further, R represents a winding resistance, $L_d$ represents a d-axis self-inductance, $L_q$ represents a q-axis self-inductance, Md represents a d-axis mutual inductance, $M_q$ represents a q-axis mutual inductance, φ represents the number of flux interlinkages, ω represents a rotation velocity, and p represents a differential operator.

The dq-axis voltage equation of the first system in a steady state in the second embodiment is represented by Expression (18) given below with a derivative operator of p=0.

$$\begin{cases} v_{d1} = R \cdot i_{d1} - \omega \cdot L_q \cdot i_{q1} - \omega \cdot M_q \cdot i_{q2} \\ v_{q1} = R \cdot i_{q1} + \omega \cdot L_d \cdot i_{d1} + \omega \cdot M_d \cdot i_{d2} + \omega \cdot \phi \end{cases} \quad (18)$$

In Expression (18) given above, when the first q-axis current $i_{q1}>0$, the second q-axis current $i_{q2}>0$, and the rotation speed ω>0 are satisfied, negative values are given to the first d-axis current $i_{d1}$ and the second d-axis current $i_{d2}$ as flux-weakening currents. At this time, Expression (18) given above is represented by Expression (19) given below through modification using the absolute values of the first d-axis current $i_{d1}$ and the second d-axis current $i_{d2}$.

$$\begin{cases} v_{d1} = -(R \cdot |i_{d1}| + \omega \cdot L_q \cdot i_{q1} + \omega \cdot M_q \cdot i_{q2}) \\ v_{q1} = R \cdot i_{q1} + \omega \cdot \phi - \omega \cdot (L_d \cdot |i_{d1}| + \omega \cdot M_d \cdot |i_{d2}|) \end{cases} \quad (19)$$

On the basis of Expression (19) given above, it is understood that the absolute value of the first d-axis voltage $v_{d1}$ becomes larger as the absolute value of the first d-axis current $i_{d1}$ becomes larger. However, it is understood that the first d-axis voltage $v_{d1}$ does not depend on the absolute value of the second d-axis current $i_{d2}$. Further, it is also understood that the first q-axis voltage $v_{q1}$ becomes smaller as the absolute values of the first d-axis current $i_{d1}$ and the second d-axis current $i_{d2}$ become larger. On the basis of those matters, it is possible to execute flux-weakening control for the first system by setting the second d-axis current $i_{d2}$ as a negative current to flow. Further, similarly to the case of the first embodiment, it is possible to decrease the output voltage in the first system also with the method of decreasing the first q-axis current $i_{q1}$.

Figure 12:
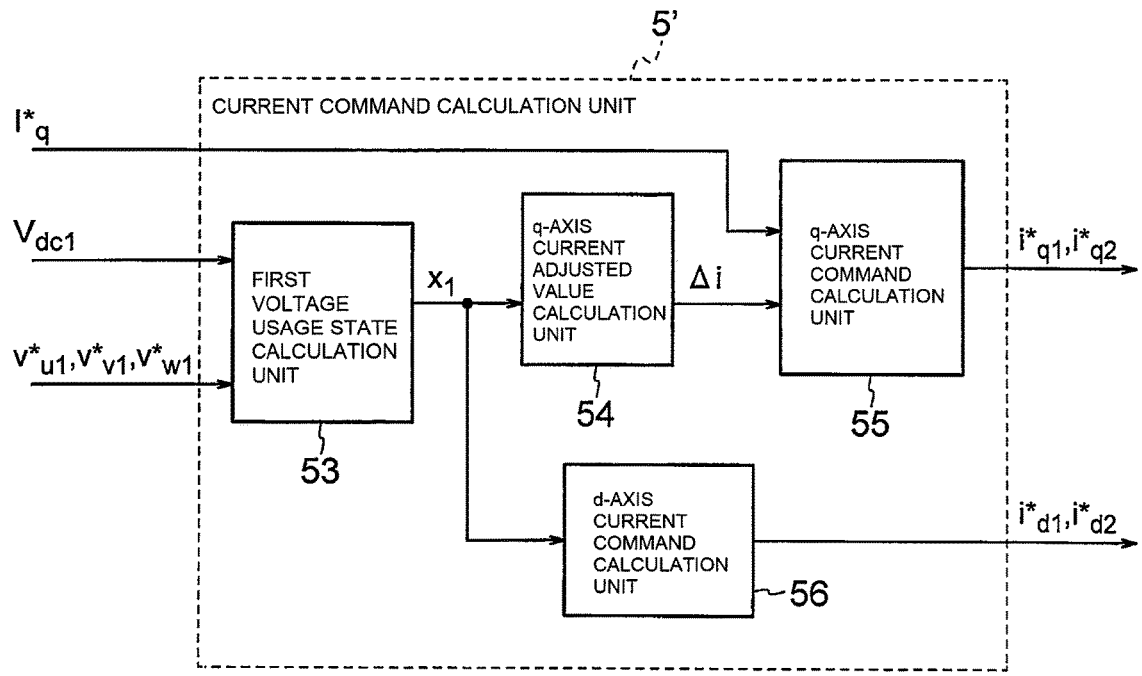
FIG. 12 is a circuit block diagram for illustrating a schematic configuration of a current command calculation unit in a second embodiment of the present invention.
Figure 13:
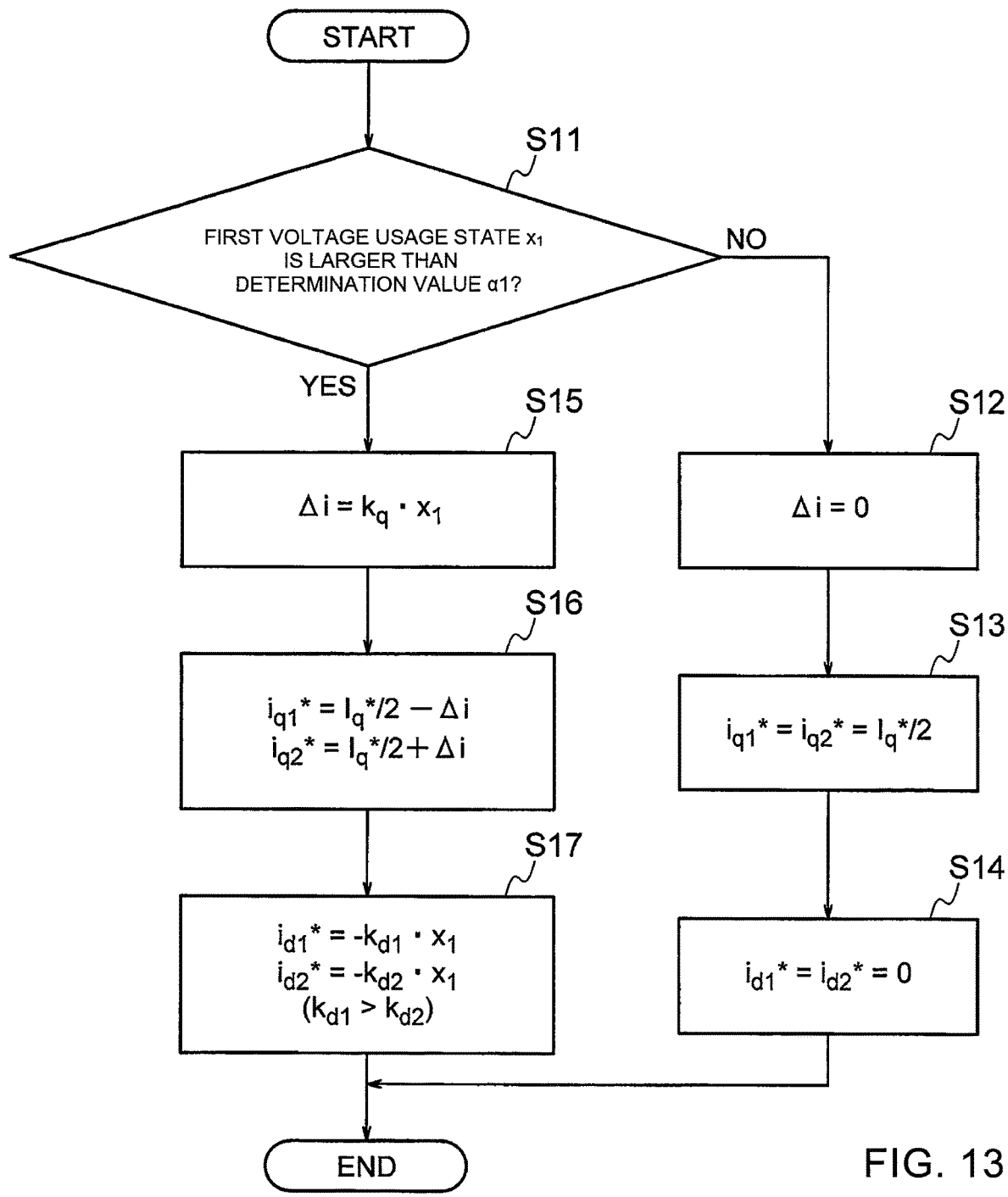
FIG. 13 is a flow chart for illustrating processing of calculating the first current command and the second current command by the current command calculation unit illustrated in FIG. 12.
Figure 14A:
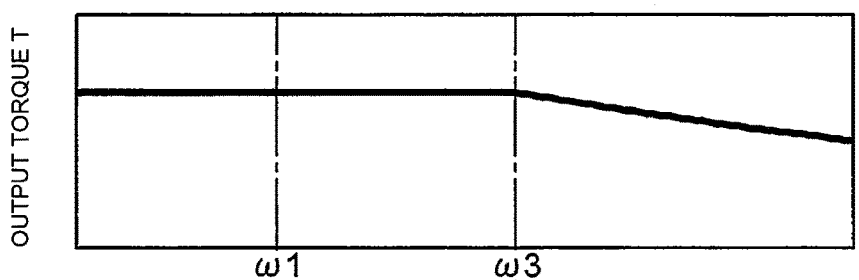
FIG. 14A is a characteristic diagram of the output torque.
Figure 14B:
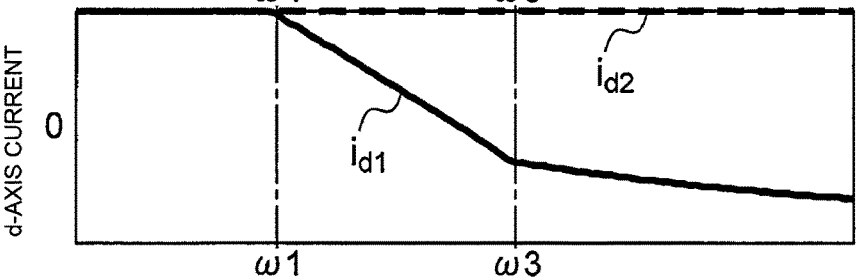
FIG. 14B is a characteristic diagram of the d-axis current.
Figure 14C:
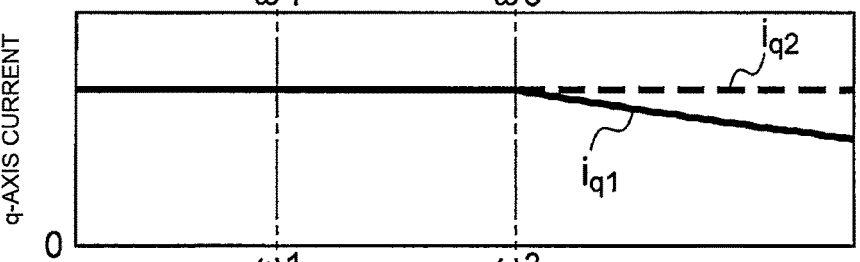
FIG. 14C is a characteristic diagram of the q-axis current.
Figure 14D:
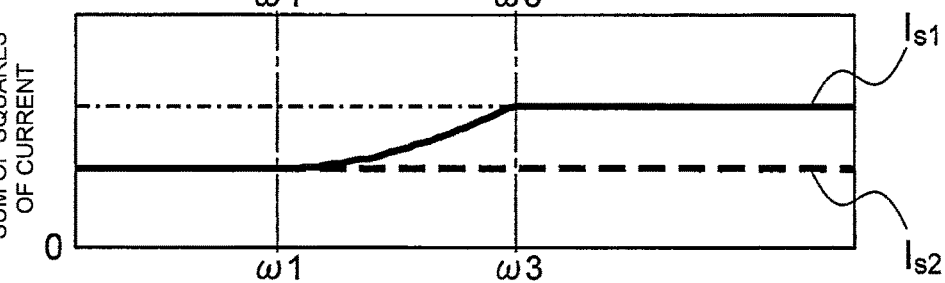
FIG. 14D is a characteristic diagram of a sum of squares of current.
Figure 14E:
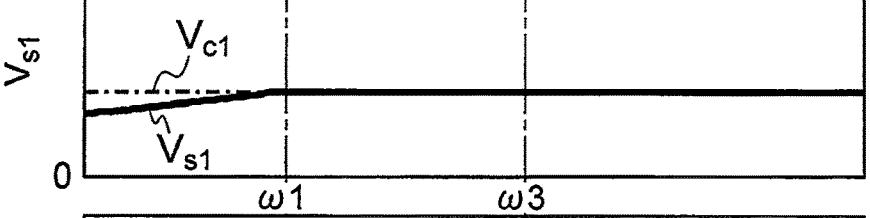
FIG. 14E is a characteristic diagram of the first output voltage.
Figure 14F:
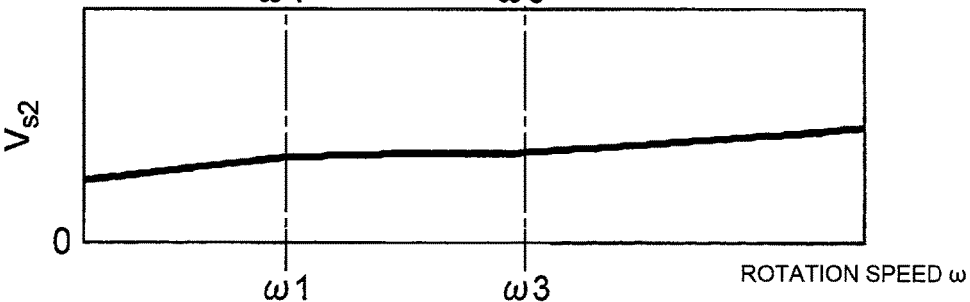
FIG. 14F is a characteristic diagram of the second output voltage.

FIG. 12 is a circuit block diagram for illustrating a schematic configuration of a current command calculation unit 5' in the second embodiment of the present invention. FIG. 13 is a flow chart for illustrating processing of calculating the first current command and the second current command by the current command calculation unit 5' in the second embodiment of the present invention.

Referring to FIG. 12, the current command calculation unit 5' additionally includes a d-axis current command calculation unit 56 configured to generate the first d-axis current command $i_{d1}^*$ and the second d-axis current command $i_{d2}^*$ based on the first voltage usage state $x_1$. Referring to the calculation processing of FIG. 13, first, similarly to the first embodiment, in Step S11, the current command calculation unit 5' determines whether the first voltage usage state $x_1$ is larger than the determination value α1. As a result of this determination, when the first voltage usage state $x_1$ is not larger than the determination value α1, the current command calculation unit 5' proceeds to Step S12, and sets the q-axis current adjusted value $\Delta i=0$. After that, the current command calculation unit 5' proceeds to Step S13, and sets the first q-axis current command $i_{q1}^*$ and the second q-axis current command $i_{q2}^*$ to be equal to each other as in Expression (5) given above. Further, the current command calculation unit 5' proceeds to Step S14 after that, sets the first d-axis current command $i_{d1}^*$ and the second d-axis voltage command $v_{d2}^*$ to 0, and ends the calculation processing.

On the contrary, when the first voltage usage state $x_1$ is larger than the determination value α1 as a result of determination in Step S11, the current command calculation unit 5' proceeds to Step S15. Then, in Step S15, the current command calculation unit 5' calculates the q-axis current adjusted value Δi in accordance with Expression (11) given above. After that, in Step S16, the current command calculation unit 5' calculates the first q-axis current command $i_{q1}^*$ and the second q-axis current command $i_{q2}^*$ in accordance with Expression (10) given above. After that, the current command calculation unit 5' sets the first d-axis current command $i_{d1}^*$ and the second d-axis current command $i_{d2}^*$ in accordance with Expression (20) given below, and ends the series of calculation processing procedures.

$$\begin{cases} i_{d1}^* = -k_{d1} \cdot x_1 \\ i_{d2}^* = -k_{d2} \cdot x_1 \end{cases} \quad (20)$$

In this expression, $k_{d1}$ represents a proportional gain for calculating the first d-axis current command $i_{d1}^*$, and $k_{d2}$ represents a proportional gain for calculating the second d-axis current command $i_{d2}^*$. Further, $k_{d1} > k_{d2}$ is set in Expression (20) given above.

On the basis of Expression (20) given above, the absolute values of the first d-axis current command $i_{d1}^*$ and the second d-axis current command $i_{d2}^*$ become larger as the first voltage usage state $x_1$ becomes larger. Thus, the effect of flux-weakening control becomes larger. At this time, the current command calculation unit 5' decreases the first q-axis current command $i_{q1}^*$, and increases the second q-axis current command $i_{q2}^*$ by the q-axis current adjusted value Δi. As a result, $k_{d1} > k_{d2}$ can be set to suppress the amount of increase in second sum of squares of current $I_{s2}$.

In Expression (20) given above, it is indicated that the current command calculation unit 5' adjusts the proportional gains $k_{d1}$ and $k_{d2}$ within a range of satisfying $k_{d1} > k_{d2}$ so that the first sum of squares of current $I_{s1}$ and the second sum of squares of current $I_{s2}$ are equal to each other. That is, when the first sum of squares of current $I_{s1}$ is larger than the second sum of squares of current $I_{s2}$, the current command calculation unit 5' decreases the proportional gain $k_{d1}$ or increases the proportional gain $k_{d2}$. On the contrary, when the first sum of squares of current $I_{s1}$ is smaller than the second sum of squares of current $I_{s2}$, the current command calculation unit 5' increases the proportional gain $k_{d1}$ or decreases the proportional gain $k_{d2}$.

Figure 15A:
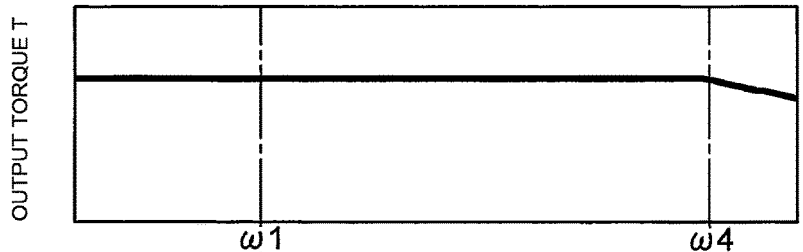
FIG. 15A is a characteristic diagram of the output torque.
Figure 15B:
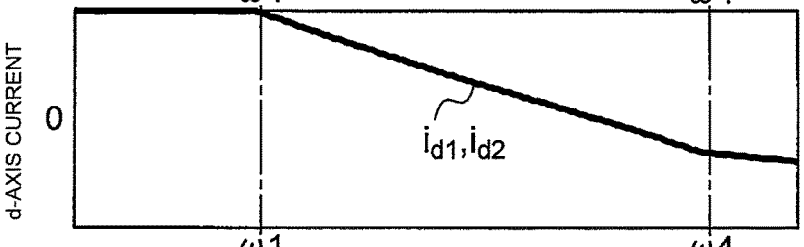
FIG. 15B is a characteristic diagram of the d-axis current.
Figure 15C:
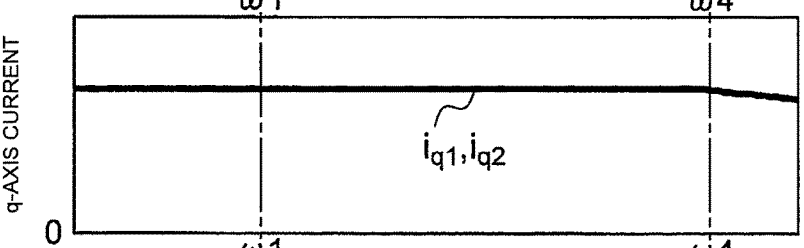
FIG. 15C is a characteristic diagram of the q-axis current.
Figure 15D:
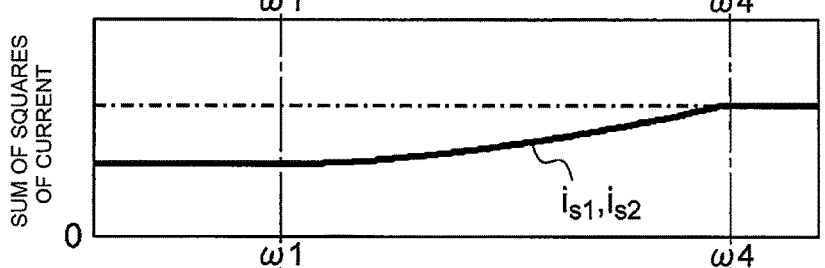
FIG. 15D is a characteristic diagram of a sum of squares of current.
Figure 15E:
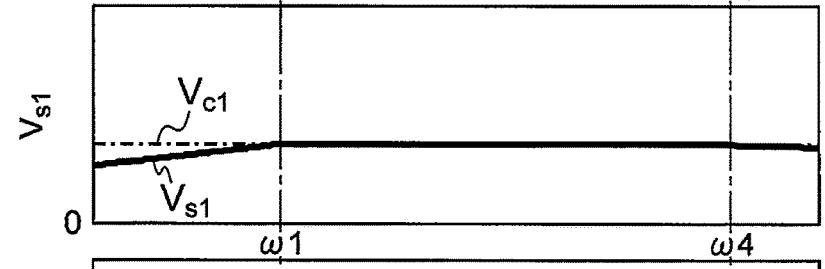
FIG. 15E is a characteristic diagram of the first output voltage.
Figure 15F:
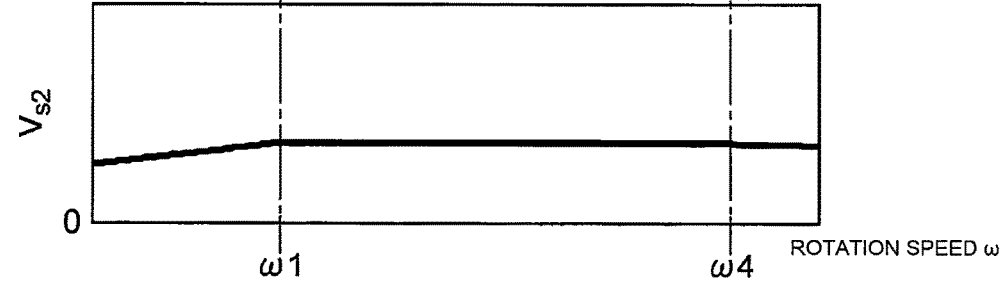
FIG. 15F is a characteristic diagram of the second output voltage.
Figure 16A:
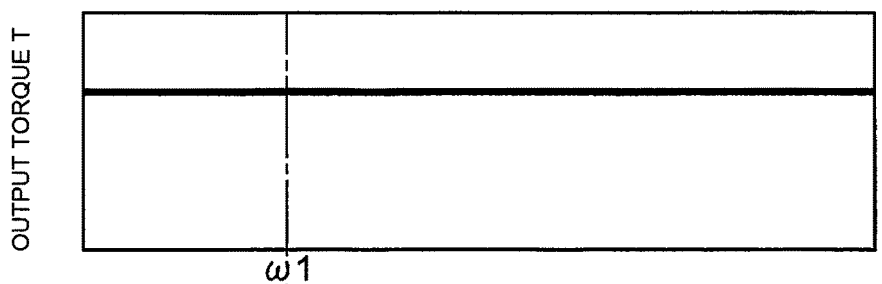
FIG. 16A is a characteristic diagram of the output torque.
Figure 16B:
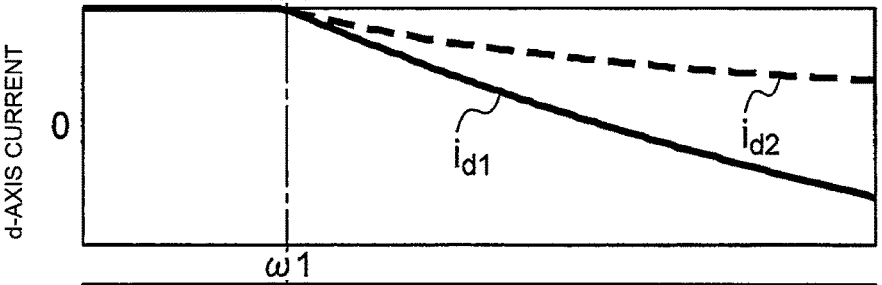
FIG. 16B is a characteristic diagram of the d-axis current.
Figure 16C:
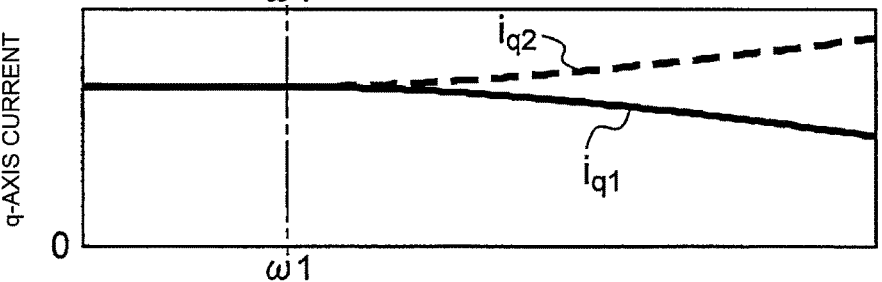
FIG. 16C is a characteristic diagram of the q-axis current.
Figure 16D:
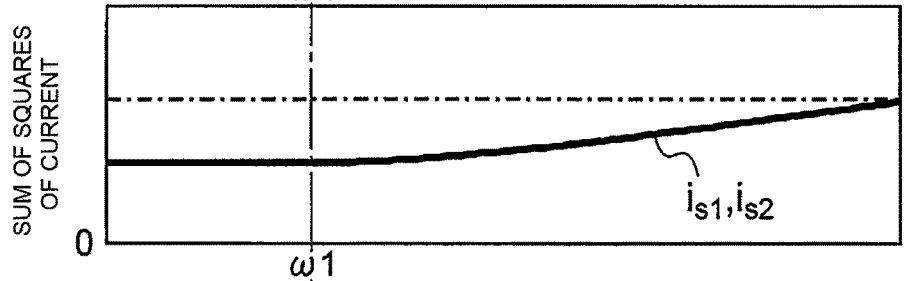
FIG. 16D is a characteristic diagram of a sum of squares of current.
Figure 16E:
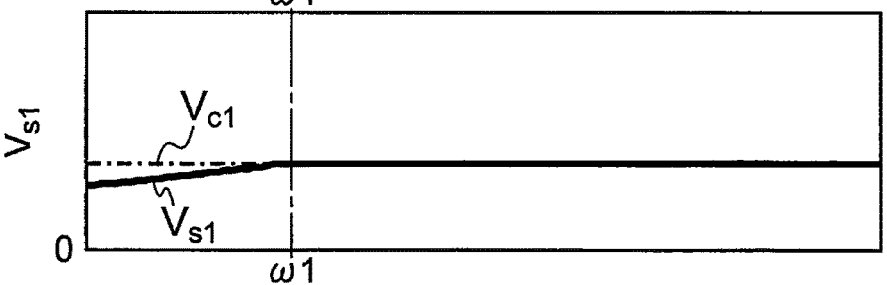
FIG. 16E is a characteristic diagram of the first output voltage.
Figure 16F:
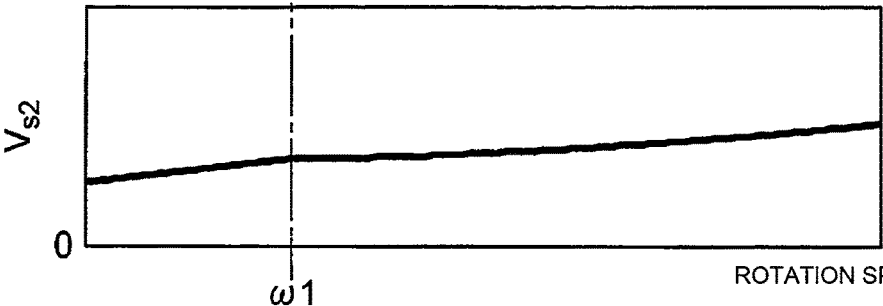
FIG. 16F is a characteristic diagram of the second output voltage.

FIG. 14 are timing charts of waveforms, which are shown by comparing various kinds of characteristics with respect to the rotation speed ω at a time when the permanent magnet synchronous motor 1' is driven by a control device in one example of the widely known technology. FIG. 15 are timing charts of waveforms, which are shown by comparing various kinds of characteristics with respect to the rotation speed ω at a time when the permanent magnet synchronous motor 1' is driven by a control device in another example of the widely known technology. FIG. 16 are timing charts of waveforms, which are shown by comparing various kinds of characteristics with respect to the rotation speed ω at a time when the permanent magnet synchronous motor 1' is driven by the control device 2' according to the second embodiment. FIG. 14A, FIG. 15A, and FIG. 16A are each a characteristic diagram of the output torque, FIG. 14B, FIG. 15B, and FIG. 16B are each a characteristic diagram of the d-axis current, and FIG. 14C, FIG. 15C, and FIG. 16C are each a characteristic diagram of the q-axis current. Further, FIG. 14D, FIG. 15D, and FIG. 16D are each a characteristic diagram of a sum of squares of current, FIG. 14E, FIG. 15E, and FIG. 16E are each a characteristic diagram of the first output voltage $V_{s1}$, and FIG. 14F, FIG. 15F, and FIG. 16F are each a characteristic diagram of the second output voltage $V_{s2}$.

The control device in one example of the widely known technology gives the first q-axis current command $i_{q1}^*$ and the second q-axis current command $i_{q2}^*$ as $i_{q1}^* = i_{q2}^* = (I_q^*/2)$. Further, the first d-axis current command $i_{d1}^*$ is given based on the first voltage usage state $x_1$, and the second d-axis current command $i_{d2}^*$ is given based on the second voltage usage state $x_2$. Further, the second DC power supply voltage $V_{dc2}$ is large, and the second output voltage $V_{s2}$ is sufficiently smaller than the second power supply voltage $V_{c2}$. Thus, the second d-axis current command $i_{d2}^* = 0$ is set. In addition, in the control device according to an example of the widely known technology, the sum of squares of current becomes larger as the first d-axis current command $i_{d1}^*$ becomes larger. Thus, in order to prevent an excessive heat state, the first q-axis current command $i_{q1}^*$ is restricted so that the sum of squares of current is equal to or smaller than the square of $I_{max}$.

Referring to FIG. 14A to FIG. 14F, the control device in one example of the widely known technology sets the first d-axis current $i_{d1}$ as a negative current to flow since the first output voltage $V_{s1}$ reaches the first power supply voltage $V_{c1}$ to have the rotation speed ω1, and executes flux-weakening control. In such a case, the first sum of squares of current $I_{s1}$ increase as the absolute value of the first d-axis current $i_{d1}$ increases. Thus, the first q-axis current command $i_{q1}^*$ is restricted since the rotation speed ω3, which reaches the square of $I_{max}$, is reached, and the first q-axis current $i_{q1}$ starts to decrease, resulting in decrease in output torque T. At this time, the second output voltage $V_{s2}$ is sufficiently smaller than the first power supply voltage $V_{c1}$, and the output voltage has a margin for the power supply voltage.

The control device in another example of the widely known technology gives the first q-axis current command $i_{q1}^*$ and the second q-axis current command $i_{q2}^*$ as $i_{q1}^* = i_{q2}^* = (I_q^*/2)$. Further, the first d-axis current command $i_{d1}^*$ is given based on the first voltage usage state $x_1$, and the second d-axis current command $i_{d2}^*$ is given based on the same value as the first d-axis current command $i_{d1}^*$. Such a method is common to the case described with reference to FIG. 8A to FIG. 8F. Further, in the control device in another example of the widely known technology, the sum of squares of current becomes larger as the first d-axis current command $i_{d1}^*$ and the second d-axis current command $i_{d2}^*$ become larger. Thus, in order to prevent an excessive heat state, the first q-axis current command $i_{q1}^*$ and the second q-axis current command $i_{q2}^*$ are restricted so that the sum of squares of current is equal to or smaller than the square of $I_{max}$.

Referring to FIG. 15A to FIG. 15F, the control device in another example of the widely known technology sets the first d-axis current $i_{d1}$ and the second d-axis current $i_{d2}$ as a negative current to flow since the first output voltage $V_{s1}$ reaches the first power supply voltage $V_{c1}$ to have the rotation speed ω1, and executes flux-weakening control. In such a case, the first sum of squares of current $I_{s1}$ and the second sum of squares of current $I_{s2}$ become larger as the absolute values of the first d-axis current $i_{d1}$ and the second d-axis current $i_{d2}$ become larger. Thus, the first q-axis current command $i_{q1}^*$ and the second q-axis current command $i_{q2}^*$ are restricted since a rotation speed ω4, which reaches the square of $I_{max}$, is reached. As a result, the first q-axis current $i_{q1}$ and the second q-axis current $i_{q2}$ start to decrease, and the output torque T decreases. At this time, the second output voltage $V_{s2}$ is sufficiently smaller than the first power supply voltage $V_{c1}$, and the output voltage has a margin for the power supply voltage. Meanwhile, regarding the characteristic of the sum of squares of current of FIG. 15D, the relationship of "first sum of squares of current $I_{s1}$=second sum of squares of current $I_{s2}$" is satisfied.

In contrast, the control device 2' according to the second embodiment of FIG. 16A to FIG. 16F decreases the first q-axis current $i_{q1}$ since the first output voltage $V_{s1}$ reaches the first power supply voltage $V_{c1}$ to have the rotation speed ω1, and compensates for the amount of decrease by increase in second q-axis current $i_{q2}$. Thus, it is possible to maintain the output torque T at a fixed level until a high rotation speed equal to or higher than the rotation speed ω4 is reached. Further, the control device 2' according to the second embodiment calculates the first d-axis current $i_{d1}$ and the second d-axis current $i_{d2}$ based on the first voltage usage state $x_1$. With this second d-axis current $i_{d2}$, it is possible to execute flux-weakening control for the first system via the mutual inductance. At this time, the second output voltage $V_{s2}$ increases more than the case of FIG. 15F due to increase in second q-axis current $i_{q2}$, but is sufficiently smaller than the second power supply voltage $V_{c2}$, which prevents occurrence of saturation of the output voltage. Meanwhile, regarding the characteristic of the sum of squares of current of FIG. 16D as well, the relationship of "first sum of squares of current $I_{s1}$=second sum of squares of current $I_{s2}$" is satisfied.

Figure 17:
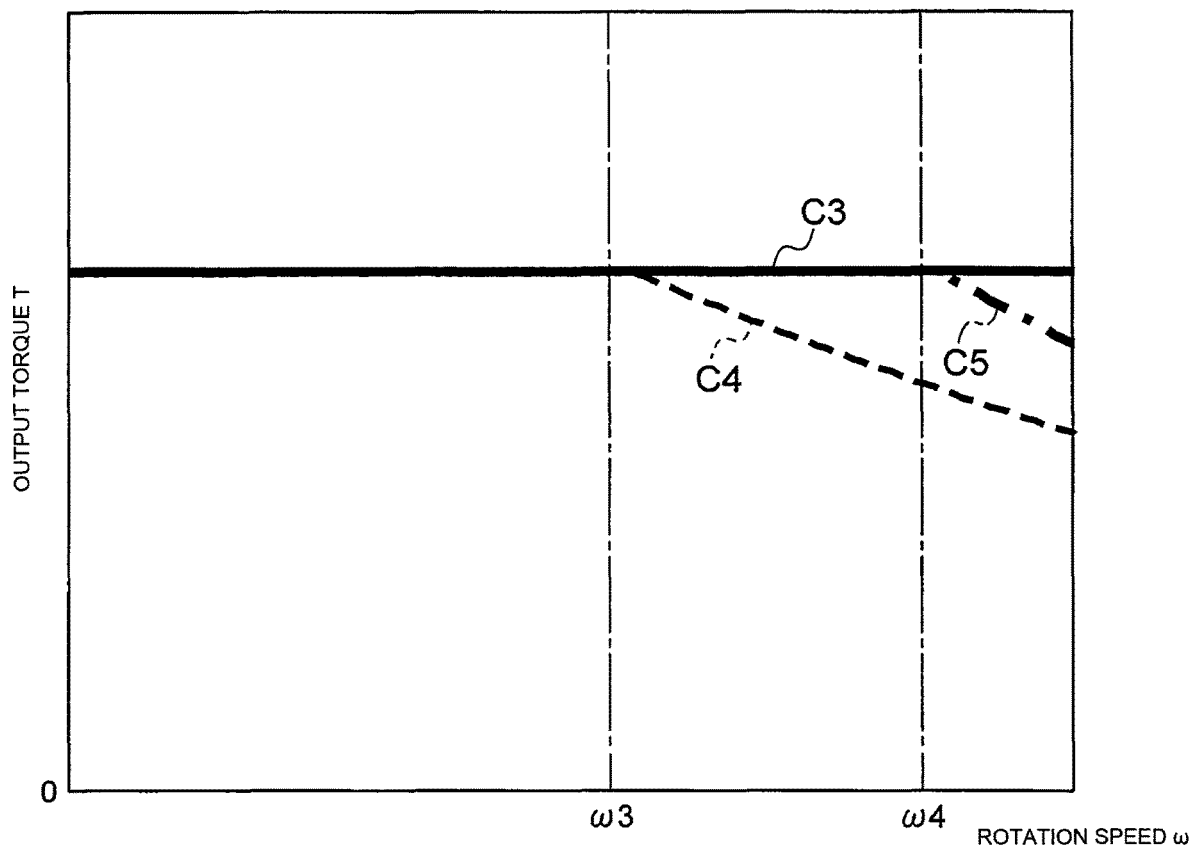
FIG. 17 is a graph, which is shown by comparing the characteristic of the output torque with the characteristics of the widely known technology in the cases of FIG. 15 and FIGS. with respect to the rotation speed at a time when the permanent magnet synchronous motor is driven by the control device according to the second embodiment of the present invention.

FIG. 17 is a graph, which is shown by comparing the characteristic C3 of the output torque T with the respective characteristics C4 and C5 of one example and another example of the widely known technology in the cases of FIG. 14A to FIG. 14F and FIG. 15A to FIG. 15F with respect to the rotation speed ω at a time when the permanent magnet synchronous motor 1' is driven by the control device 2' according to the second embodiment of the present invention.

Referring to FIG. 17, the output torque T decreases when the rotation speed ω exceeds the rotation speed ω3 for the characteristic C4 in one example of the widely known technology, and the output torque T decreases when the rotation speed ω exceeds the rotation speed ω4 for the characteristic C5 in another example of the widely known technology. The relationship of "rotation speed ω4>rotation speed ω3" is satisfied as the relationship of the rotation speed ω. With this, it is understood that the output torque T is improved more for the characteristic C5 in a high-speed rotation region than for the characteristic C4. In contrast, the output torque T is maintained at a fixed level for the characteristic C3 in the second embodiment even when the rotation speed ω4 is exceeded, and it is understood that the output torque T is improved even more in the high-speed rotation region.

It is assumed that the control device according to the second embodiment has a mutual inductance between the first winding 11 and the second winding 12 in the permanent magnet synchronous motor 1'. Further, the current command calculation unit calculates the first d-axis current command $i_{d1}^*$ and the first q-axis current command $i_{q1}^*$ on the rotation coordinate axes as the first current command. Further, the current command calculation unit calculates the second d-axis current command $i_{d2}^*$ and the second q-axis current command $i_{q2}^*$ on the rotation coordinate axes as the second current command, and calculates the second d-axis current command $i_{d2}^*$ based on the first voltage usage state $x_1$. That is, the current command calculation unit calculates the second d-axis current command $i_{d2}^*$ based on the first voltage usage state $x_1$. Thus, it is possible to perform flux-weakening control for the output voltage in the first system on the low-voltage side via the mutual inductance by the second d-axis current $i_{d2}$. As a result, it is possible to sufficiently improve the output torque T in the high-speed region by successively avoiding saturation of the output voltage in the first system having a low power supply voltage.

Further, when the first voltage usage state $x_1$ is larger than the determination value α1, the current command calculation unit performs calculation so that the absolute value of the second q-axis current command $i_{q2}^*$ is larger than that of the first q-axis current command $i_{q1}^*$. As a result, it is possible to sufficiently improve the output torque T by increasing the absolute value of the second q-axis current $i_{q2}$ while at the same time decreasing the absolute value of the first q-axis current $i_{q1}$ to avoid saturation of the output voltage in the first system on the low-voltage side. This control function can also be applied to the current command calculation unit in the first embodiment.

Further, the current command calculation unit calculates the second q-axis current command $i_{q2}^*$ based on the first voltage usage state $x_1$ so that the absolute value of the second q-axis current command $i_{q2}^*$ is larger than an average value between the absolute value of the first q-axis current command $i_{q1}^*$ and the absolute value of the second q-axis current command $i_{q2}^*$ by the q-axis current adjusted value Δi. Further, the current command calculation unit calculates the first q-axis current command $i_{q1}$ based on the first voltage usage state $x_1$ so that the absolute value of the first q-axis current command $i_{q1}$ is smaller than the average value by the q-axis current adjusted value Δi. As a result, it is possible to sufficiently improve the output torque T by increasing the absolute value of the second q-axis current $i_{q2}$ while at the same time decreasing the absolute value of the first q-axis current $i_{q1}$ to avoid saturation of the output voltage in the first system on the low-voltage side. This control function is similar to the case of the current command calculation unit in the first embodiment.

Meanwhile, in the above-mentioned example, the first d-axis current command $i_{d1}^*$ and the second d-axis current command $i_{d2}^*$ are set as values proportional to the first voltage usage state $x_1$. However, those values may be set by another method as long as the method performs calculation based on the first voltage usage state $x_1$. In setting of the first q-axis current command $i_{q1}^*$ and the second q-axis current command $i_{q2}^*$, the absolute value of the first q-axis current command $i_{q1}^*$ is only required to be set to be smaller than the absolute value of the second q-axis current command $i_{q2}^*$, and the absolute value of the first d-axis current command $i_{d1}^*$ is only required to be set to be larger than the absolute value of the second d-axis current command $i_{d2}^*$. With this, it is possible to prevent any one of the first system and the second system from having an excessively large sum of squares of current, to thereby suppress increase in temperature. Further, it is possible to suppress increase in temperature more stably by setting the first sum of squares of current $I_{s1}$ and the second sum of squares of current $I_{s2}$ to be equal to each other and setting heat caused in the first system and heat caused in the second system to be equal to each other.

For example, Expressions (21) and (22) given below may be set in order to set the first sum of squares of current $I_{s1}$ and the second sum of squares of current $I_{s2}$ to be equal to each other.

$$i_{d1}^* = -x_1 \cdot k_{d1} \quad (21)$$

$$i_{d2}^* = -\sqrt{i_{d1}^{*2} + i_{q1}^{*2} - i_{q2}^{*2}} = -\sqrt{i_{d1}^{*2} - 2 \cdot \Delta i} = -\sqrt{i_{d1}^{*2} - 2 \cdot (k_q \cdot x_1)}$$

(22)

That is, the current command calculation unit calculates the first d-axis current command $i_{d1}^*$ proportional to the first voltage usage state $x_1$ in accordance with Expression (21) given above, and calculates the second d-axis current command $i_{d2}^*$, which is obtained under a condition that the sums of squares of current are equal to each other, in accordance with Expression (22) given above.

The current command calculation unit calculates the second q-axis current command $i_{q2}^*$ so that the absolute value of the second q-axis current command $i_{q2}^*$ becomes larger, and at the same time calculates the second d-axis current command so that the absolute value of the second d-axis current command becomes smaller than the absolute value of the first d-axis current command $i_{d1}^*$. As a result, it is possible to decrease a current caused to flow through the second winding 12, to thereby suppress heat. This control function can also be applied to the current command calculation unit in the first embodiment.

Further, the current command calculation unit sets the first sum of squares of current $I_{s1}$, which is a sum of squares of current of the first d-axis current command $i_{d1}^*$ and squares of the first q-axis current command $i_{q2}^*$, and the second sum of squares of current $I_{s2}$, which is a sum of squares of current of the second d-axis current command $i_{d2}^*$ and squares of the second q-axis current command $i_{q2}^*$, to be equal to each other. As a result, it is possible to set heat caused in the first winding 11 and heat caused in the second winding 12 to be equal to each other, to thereby prevent heat from being concentrated on only one winding to cause occurrence of excessive increase in temperature. This control function is similar to the case of the current command calculation unit in the first embodiment.

In the second embodiment, the method of calculating the d-axis current command and the q-axis current command based on the first voltage usage state $x_1$ is described. However, only the d-axis current command may be used without using both commands. That is, the q-axis current command may be represented by $i_{q1}^* = i_{q2}^* = (I_q^*/2)$, which is used in the related-art method, and the d-axis current command may be represented by Expression (20) given above. Also in such a case, the second d-axis current command $i_{d2}^*$ is calculated based on the first voltage usage state $x_1$. With this, it is possible to execute flux-weakening control for the first system by the second current command. As a result, it is possible to avoid such a situation that a current is not caused to flow in accordance with the current command in the first winding 11 and the second winding 12 due to saturation of the output voltage.

Meanwhile, regarding the second current command in the second embodiment, the q-axis current adjusted value $\Delta i$ is given as a value proportional to the first voltage usage state to calculate the second q-axis current command, and the second d-axis current command is calculated as a value proportional to the first voltage usage state $x_1$. However, the calculation method is not limited thereto, and the second current command is only required to be a value based on the first voltage usage state $x_1$. For example, such an equality or inequality restriction based on the first voltage usage state $x_1$ as to prevent saturation of the output voltage in the first system may be given, and the second current command satisfying the equality or inequality restriction may be calculated by using an optimization method.

Third Embodiment

A third embodiment of the present invention relates to an electric power steering system including the permanent magnet synchronous motor 1 and the control device 2, or the permanent magnet synchronous motor 1' and the control device 2' of the first embodiment or the second embodiment described above.

Figure 18:
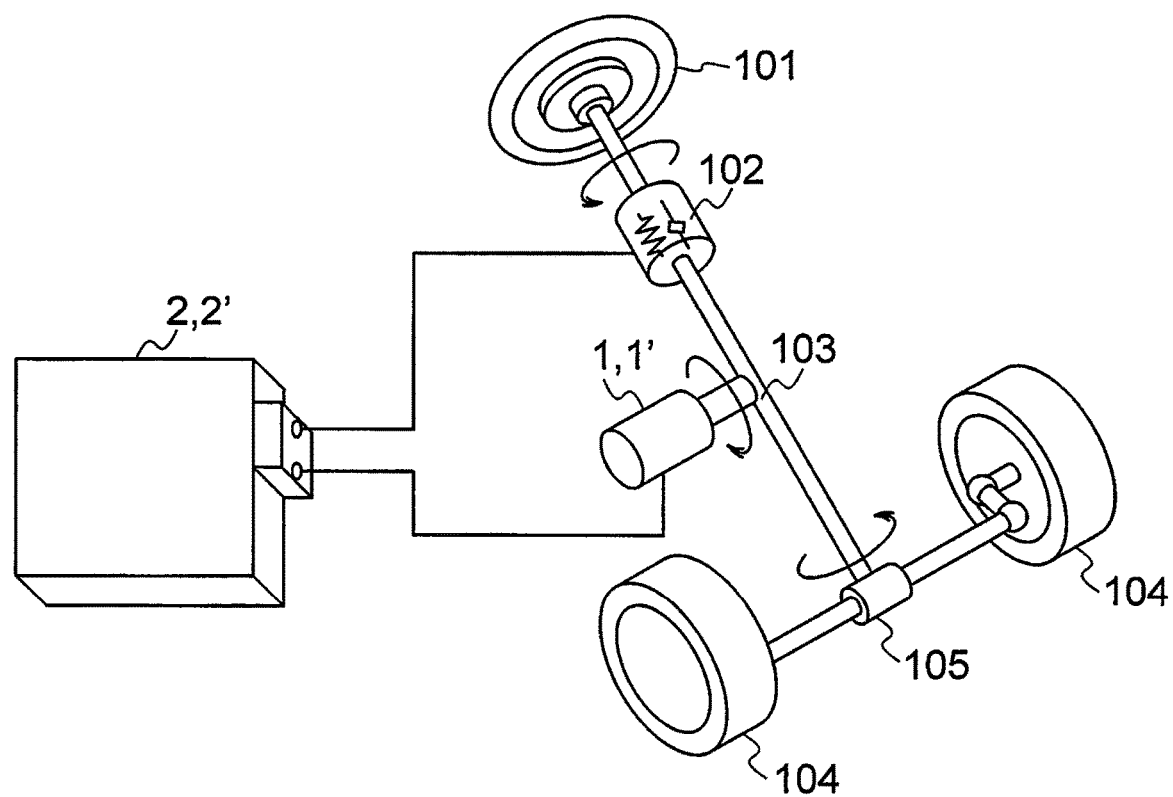
FIG. 18 is a diagram for illustrating a schematic configuration of an electric power steering device according to a third embodiment of the present invention.

FIG. 18 is a diagram for illustrating a schematic configuration of an electric power steering device according to the third embodiment of the present invention.

Referring to FIG. 18, in the electric power steering device, a steering wheel 101 is mounted to one end of a steering shaft 103, and wheels 104 is mounted to the other end of the steering shaft 103 via a rack-and-pinion gear 105 in terms of structure. Further, a torque sensor 102 is provided on the steering wheel 101 side of the steering shaft 103. Further, the permanent magnet synchronous motor 1 or 1' described in the first embodiment or the second embodiment is mounted to the shaft on the rack-and-pinion gear 105 side of the steering shaft 103, which rotates in a clockwise direction of the steering shaft 103 orthogonal to a counterclockwise rotation direction of the steering shaft 103. In addition, the control device 2 or 2' described in the first embodiment or second embodiment is connected to the torque sensor 102 and the permanent magnet synchronous motor 1.

Among those components, the permanent magnet synchronous motor 1 or 1' serves to assist a driver in performing steering. The torque sensor 102 serves to detect a steering torque given by the driver. In this electric power steering system, the steering torque given to the steering wheel 101 by the driver passes through a torsion bar of the torque sensor 102 and the steering shaft 103, and then is transmitted to a rack via the rack-and-pinion gear 105, to thereby steer the wheels 104. At this time, the permanent magnet synchronous motor 1 or 1' is driven by the control device 2 or 2', and generates an assist force as the output. The assist force is transmitted to the steering shaft 103, and reduces a steering torque given by the driver at the time of steering.

Now, there is given an exemplary case in which the first power supply circuit 31 in the control device 2 or 2' is set as a 12 V battery, and the second power supply circuit 32 is set as a 48 V battery. In this case, the first current command and the second current command are calculated based on a steering torque given by the driver, which is detected by the torque sensor 102. For example, the basic q-axis current command $I_q^*$ for calculating the first current command and the second current command is calculated to be a value proportional to the steering torque given by the driver.

The electric power steering system having such a configuration includes the control device 2 or 2' of the first or second embodiment described above, and thus the current command calculation unit 5 or 5' calculates the first current command and the second current command based on the steering torque given by the driver. In this manner, it is possible to obtain an assist force that depends on the steering torque given by the driver from the permanent magnet synchronous motor 1 or 1' even at the time of high-speed steering when the first current command and the second current command are calculated based on the steering torque given by the driver. As a result, it is possible to provide the electric power steering device that enables comfortable steering.

Fourth Embodiment

A fourth embodiment of the present invention relates to an electric vehicle including the permanent magnet synchronous motor 1 and the control device 2, or the permanent magnet synchronous motor 1' and the control device 2' of the first embodiment or the second embodiment described above.

Figure 19:
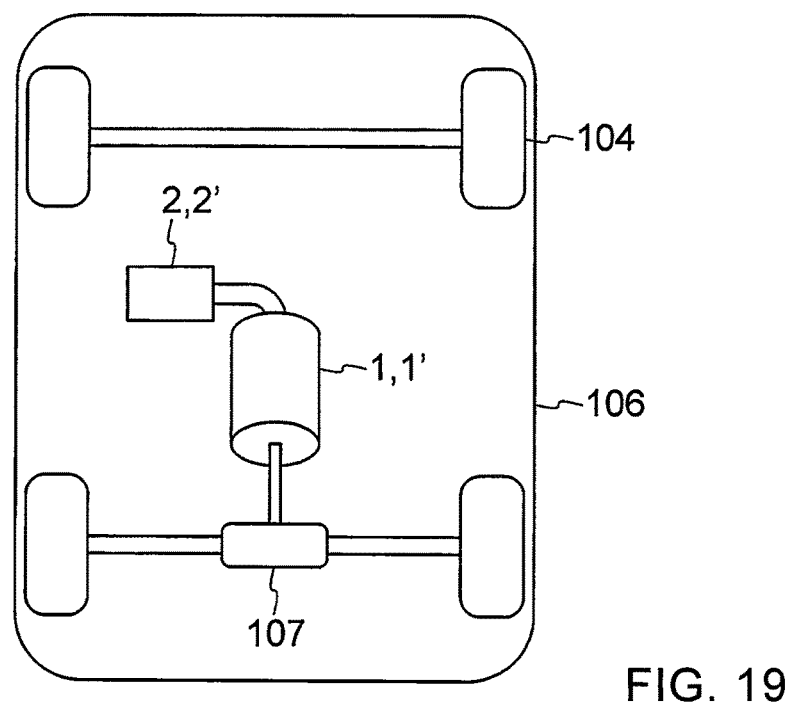
FIG. 19 is a diagram for illustrating a schematic configuration of an electric vehicle according to a fourth embodiment of the present invention.

Referring to FIG. 19, this electric vehicle is desirably applied to an electric automobile (EV), which is one example thereof. In this electric vehicle, the permanent magnet synchronous motor 1 and the control device 2, or the permanent magnet synchronous motor 1' and the control device 2' are installed in a vehicle body 106. The torque for driving the vehicle, which is caused by the permanent magnet synchronous motor 1 or 1', is transmitted to the wheels 104 via a driving gear 107, to thereby rotate the wheels 104. As a result, the electric vehicle moves forward or backward.

In the control device 2 or 2', the first current command and the second current command are calculated based on the amount of operation of an acceleration pedal performed by the driver, to thereby obtain such a torque for driving the vehicle as to achieve traveling intended by the driver. For example, the control device 2 or 2' calculates the basic q-axis current command $I_q^*$ for calculating the first current command and the second current command as a value proportional to the amount of operation of the acceleration pedal performed by the driver.

The electric vehicle having such a configuration includes the control device 2 or 2' of the first or second embodiment given above, and thus the current command calculation unit 5 or 5' calculates the first current command and the second current command based on the steering torque given by the driver. In this manner, it is possible to obtain a torque for driving the vehicle, which depends on the amount of operation of the accelerator pedal performed by the driver, even at the time of high-speed traveling when the first current command and the second current command are calculated based on the amount of operation of the accelerator pedal performed by the driver. As a result, it is possible to provide an electric vehicle that enables comfortable traveling.

Meanwhile, when the electric vehicle is an electric automobile, the electric vehicle has a configuration of supplying power to the first power converter 41 and the second power converter 42, which are connected to the permanent magnet synchronous motor 1 or 1' for driving the vehicle in general, by using two 48 V batteries. However, when one battery fails, the control device 2 or 2' includes the second power supply circuit 32, which is a normal battery configured to output 48 V, and the first power supply circuit 31, which is a failed battery configured to output a voltage lower than 48 V, for example. It is possible to sufficiently improve the output torque T in a high-speed region even under such a situation. Alternatively, irrespective of the failure, the control device 2 or 2' may include the second power supply circuit 32, which is a normal battery configured to output 48 V, and the first power supply circuit 31, which is a 12 V battery configured to supply power to the electric power steering device described in the third embodiment.

Each embodiment described above is not limited to the above-mentioned configuration, and those embodiments may be combined. Further, each embodiment can also be combined with the related-art method. For example, the q-axis current adjusted value Δi and the second d-axis current command $i_{d2}^*$ may be calculated based on the first voltage usage state $x_1$ and the second voltage usage state $x_2$.

That is, the present invention is not limited to each embodiment described above, and various kinds of modifications can be made within a range that does not depart from the gist of the present invention. All the technical matters included in the technical idea described in the appended claims are included in the scope of the present invention. A preferred example has been given as each embodiment described above. However, a person skilled in the art could arrive at various kinds of modification examples based on the content disclosed herein. Also in such a case, those modification examples are included in the appended claims.

REFERENCE SIGNS LIST

1, 1' permanent magnet synchronous motor, 2, 2' control device, 5, 5' current command calculation unit, 11 first winding, 12 second winding, 13 angle detector, 31 first power supply circuit, 32 second power supply circuit, 41 first power converter, 42 second power converter, 53, 53' first voltage utilization state calculation unit, 54 q-axis current adjusted value calculation unit, 55 q-axis current command calculation unit, 56 d-axis current command calculation unit, 61 first current control unit, 62 second current control unit, 101 steering wheel, 102 torque sensor, 103 steering shaft, 104 wheel, 105 rack-and-pinion gear, 106 vehicle body, 107 driving gear, 613 first coordinate conversion unit, 623 second coordinate conversion unit, 614 first voltage command calculation unit, 624 second voltage command calculation unit, 614*d*, 614*q*, 624*d*, 624*q* PI controller

The invention claimed is:

1. A control device for a permanent magnet synchronous motor including a first winding and a second winding, the control device comprising:
   a first power converter configured to apply a voltage to the first winding;
   a second power converter configured to apply a voltage to the second winding;
   a first power supply circuit configured to supply power to the first power converter;
   a second power supply circuit configured to supply power to the second power converter at a voltage higher than a voltage of the first power supply circuit;
   a current command calculator configured to calculate a first current command being a target value of a current caused to flow through the first winding, and a second current command being a target value of a current caused to flow through the second winding;
   a first current controller configured to control an output voltage of the first power converter in accordance with the first current command; and
   a second current controller configured to control an output voltage of the second power converter in accordance with the second current command,
   wherein the current command calculator is configured to calculate a first voltage usage state, which is an indicator value correlated with a magnitude of the output voltage of the first power converter with respect to a power supply voltage output at a time of supply of power by the first power supply circuit, and calculate the second current command based on the first voltage usage state.

2. The control device for a permanent magnet synchronous motor according to claim 1,
   wherein the permanent magnet synchronous motor has a mutual inductance between the first winding and the second winding, and
   wherein the current command calculator is configured to:
      calculate, as the first current command, a first d-axis current command and a first q-axis current command on rotation coordinate axes;

calculate, as the second current command, a second d-axis current command and a second q-axis current command on the rotation coordinate axes; and calculate the second d-axis current command based on the first voltage usage state.

3. The control device for a permanent magnet synchronous motor according to claim 2, wherein, when the first voltage usage state is larger than a determination value, the current command calculator calculates the second d-axis current command so that an absolute value of the second d-axis current command is larger than an absolute value of the first d-axis current command.

4. The control device for a permanent magnet synchronous motor according to claim 1, wherein the current command calculator is configured to:

calculate, as the first current command, a first d-axis current command and a first q-axis current command on rotation coordinate axes;

calculate, as the second current command, a second d-axis current command and a second q-axis current command on the rotation coordinate axes; and calculate the second q-axis current command so that an absolute value of the second q-axis current command is larger than an absolute value of the first q-axis current command when the first voltage usage state is larger than a determination value.

5. The control device for a permanent magnet synchronous motor according to claim 4, wherein the current command calculator is configured to calculate the second d-axis current command so that an absolute value of the second d-axis current command is smaller than an absolute value of the first d-axis current command.

6. The control device for a permanent magnet synchronous motor according to claim 4, wherein the current command calculator is configured to perform calculation so that a first sum of squares of current, which is a sum of squares of the first d-axis current command and squares of the first q-axis current command, and a second sum of squares of current, which is a sum of squares of the second d-axis current command and squares of the second q-axis current command, are equal to each other.

7. The control device for a permanent magnet synchronous motor according to claim 4, wherein the current command calculator is configured to:

calculate the second q-axis current command based on the first voltage usage state so that an absolute value of the second q-axis current command is larger than an average value between an absolute value of the first q-axis current command and an absolute value of the second q-axis current command by a q-axis current adjusted value $\Delta i$; and calculate the first q-axis current based on the first voltage usage state so that an absolute value of the first q-axis current is smaller than the average value by the q-axis current adjusted value $\Delta i$.

8. An electric power steering device, comprising:

the permanent magnet synchronous motor to be controlled by the control device for a permanent magnet synchronous motor of claim 1; and the control device, wherein the current command calculator is configured to calculate the first current command and the second current command based on a steering torque given by a driver.

9. An electric vehicle, comprising:

the permanent magnet synchronous motor to be controlled by the control device for the permanent magnet synchronous motor of claim 1; and the control device, wherein the current command calculator is configured to calculate the first current command and the second current command based on an amount of operation of an acceleration pedal performed by a driver.

* * * * *